United States Patent
Sasaki et al.

(10) Patent No.: US 9,961,220 B2
(45) Date of Patent: May 1, 2018

(54) RECORDING APPARATUS AND IMAGE READING APPARATUS

(71) Applicant: SEIKO EPSON CORPORATION, Tokyo (JP)

(72) Inventors: Keisuke Sasaki, Matsumoto (JP); Yosuke Nakano, Matsumoto (JP); Satoshi Yoshino, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days. days.

(21) Appl. No.: 15/435,558

(22) Filed: Feb. 17, 2017

(65) Prior Publication Data

US 2017/0251118 A1 Aug. 31, 2017

(30) Foreign Application Priority Data

Feb. 26, 2016 (JP) ................................. 2016-035180

(51) Int. Cl.
| | |
|---|---|
| *F16H 1/20* | (2006.01) |
| *H04N 1/00* | (2006.01) |
| *E05D 1/00* | (2006.01) |
| *E05D 11/10* | (2006.01) |
| *E05F 1/12* | (2006.01) |
| *E05F 3/20* | (2006.01) |

(52) U.S. Cl.
CPC .......... *H04N 1/00554* (2013.01); *E05D 1/00* (2013.01); *E05D 11/1028* (2013.01); *E05F 1/1207* (2013.01); *E05F 3/20* (2013.01); *F16H 1/20* (2013.01); *H04N 1/00535* (2013.01); *E05Y 2900/606* (2013.01); *H04N 2201/0094* (2013.01)

(58) Field of Classification Search
CPC ...... E05D 1/00; E05D 11/1028; E05F 1/1207; E05F 3/20; E05Y 2900/606; H04N 1/00535; H04N 1/00554; H04N 2201/0094
See application file for complete search history.

(56) References Cited

U.S. PATENT DOCUMENTS

| | | | | |
|---|---|---|---|---|
| 7,072,603 B2* | 7/2006 | Tsuzuki | ............. | G03G 21/1821 399/111 |
| 8,805,259 B2* | 8/2014 | Fujiwara | ............. | G03G 21/1685 399/122 |
| 8,902,473 B2* | 12/2014 | Nakano | ............. | H04N 1/00631 358/296 |
| 9,013,768 B2* | 4/2015 | Ino | ....................... | H04N 1/0058 358/474 |

FOREIGN PATENT DOCUMENTS

JP 2013-209190 A 10/2013

* cited by examiner

*Primary Examiner* — Anh T.N. Vo
(74) *Attorney, Agent, or Firm* — Workman Nydegger

(57) ABSTRACT

A recording apparatus includes a rotating body that opens and closes an apparatus main body which is provided with a recording portion that performs recording on a medium and rotates between a first posture that is a closed posture and a second posture that is an open posture, a biasing unit that biases the rotating body in an opening direction, and a biasing release unit that releases an action of a biasing force applied by the biasing unit to the rotating body in a range from a third posture, which is a posture between the first posture and the second posture, to the second posture.

9 Claims, 21 Drawing Sheets

RECORDING APPARATUS AND IMAGE READING APPARATUS

BACKGROUND

1. Technical Field

The present invention relates to a recording apparatus that performs recording on a medium. In addition, the invention relates to an image reading apparatus that reads an image of a document.

2. Related Art

An ink jet printer will be described below as an example of the recording apparatus. An ink jet printer is provided with a scanner on an upper portion of a recording mechanism portion that performs recording on a paper sheet as an example of a recording medium, and is a type that is referred to as a so-called multifunction printer. In addition, a tiltable operation panel as indicated in JP-A-2013-209190 is provided in such a type of ink jet printer.

In the ink jet printer in JP-A-2013-209190, the operation panel is tilted in response to a motive force of a motor. However, in a configuration in which the operation panel is tilted in response to a motive force of the motor, there is a risk that a jarring operation sound is generated in some cases.

In addition, there is demand for the operation panel to be provided with an automatic tilt range and a manual tilt range. The ink jet printer that is provided with a conventional tiltable operation panel is unable to deal with both of the problem and the demand described above.

SUMMARY

An advantage of some aspects of the invention is to provide an apparatus in which the jarring driving sound is suppressed while taking into consideration the degree of freedom of an operation of a rotating body or a moving object.

According to an aspect of the invention, there is provided a recording apparatus including a rotating body that opens and closes an apparatus main body which is provided with a recording portion that performs recording on a medium and rotates between a first posture that is a closed posture and a second posture that is an open posture, a biasing unit that biases the rotating body in an opening direction, and a biasing release unit that releases the action of a biasing force applied by the biasing unit to the rotating body, the action being, in a range from a third posture, which is a posture between the first posture and the second posture, to the second posture.

According to the aspect, since the rotating body rotates in the opening direction in response to a biasing force of the biasing unit, it is possible to suppress a jarring driving sound compared with a configuration in which the rotating body is opened by utilizing a driving source such as a motor.

In addition, because of the biasing release unit, the biasing force of the biasing unit does not act on the rotating body in a range in which the rotating body moves from the third posture to the second posture, and therefore, it is possible to secure the degree of freedom of operation of the rotating body.

In the recording apparatus, the biasing release unit includes a first gear on which the biasing force of the biasing unit acts normally, a rotation stopping unit that stops rotation of the first gear in the third posture when the rotating body moves from the first posture to the second posture, and a second gear that engages with the first gear and transfers the rotation of the first gear to the rotating body, in which a clearance in which the second gear is able to rotate independently from the first gear is provided between the first gear and the second gear, and using the clearance, the rotating body rotates between the third posture and the second posture without being subjected to the biasing force of the biasing unit.

According to the aspect, since there is a configuration in which the rotating body rotates between the third posture and the second posture without being subjected to the biasing force of the biasing unit with the clearance which is provided between the first gear and the second gear, it is possible to configure the biasing release unit with a simple structure and at low cost.

In the recording apparatus, the rotating body is provided with a meshing portion that meshes with the second gear, and a phase setting portion that sets the meshing phase is provided between the second gear and the meshing portion.

According to the aspect, since the rotating body is provided with the meshing portion that meshes with the second gear, and the phase setting portion that sets the meshing phase is provided between the second gear and the meshing portion, it is possible to set the phase between the second gear and the meshing portion to an appropriate state with easy workability.

In the recording apparatus, there is provided a damper that provides resistance to rotation of the rotating body when the rotating body has a posture between the first posture and the third posture.

According to the aspect, since the damper that provides resistance to rotation of the rotating body when the rotating body has the posture between the first posture and the third posture is provided, it is possible to provide a suppressive force when the rotating body rotates in response to the biasing force of the biasing unit, and it is possible to achieve noise reduction.

In the recording apparatus, the biasing unit has elastic energy in a state in which the rotating body is in the third posture.

According to the aspect, since the biasing unit has elastic energy in the state in which the rotating body is in the third posture, when the rotating body is open from the first posture toward the third posture, it is possible to avoid a defect of stopping before the third posture, and it is possible to more reliably switch the rotating body from the first posture to the third posture.

In the recording apparatus, there is provided a posture holding unit that holds the posture of the rotating body between the third posture and the second posture.

According to the aspect, it is possible to hold the posture of the rotating body between the third posture and the second posture.

According to another aspect of the invention there is provided a recording apparatus including a moving object that moves between a first position and a second position, which is a position that is located further from the apparatus main body than the first position, in an apparatus main body including a recording portion that performs recording on the medium, a biasing unit that biases the moving object in a direction of protrusion, and a biasing release unit that releases the action of the biasing force applied by the biasing unit to the moving object in a range from a third position, which is a position between the first position and the second position, to the second position.

According to the aspect, since the moving object moves in the direction of protrusion in response to the biasing force of the biasing unit, it is possible to suppress the jarring driving sound compared with a configuration in which the moving object is caused to protrude by utilizing a driving source such as a motor.

In addition, the biasing force of the biasing unit does not act on the moving object in response to the biasing release unit in a range in which the moving object moves from the third position to the second position, and therefore, it is possible to secure a degree of freedom of operation of the moving object.

According to yet another aspect of the invention, there is provided an image reading apparatus including a rotating body that opens and closes an apparatus main body which is provided with a reading portion that reads a document and rotates between a first posture that is a closed posture and a second posture that is an open posture, a biasing unit that biases the rotating body in an opening direction, and a biasing release unit that releases an action of the biasing force applied by the biasing unit to the rotating body in a range from a third posture, which is a posture between the first posture and the second posture, to the second posture.

According to the aspect, since the rotating body rotates in the opening direction in response to the biasing force of the biasing unit, it is possible to suppress the jarring driving sound compared with a configuration in which the rotating body is opened by utilizing a driving source such as a motor.

In addition, the biasing force of the biasing unit does not act on the rotating body in response to the biasing release unit in a range in which the rotating body moves from the third posture to the second posture, and therefore, it is possible to secure a degree of freedom of operation of the rotating body.

According to still another aspect of the invention, there is provided an image reading apparatus including a moving object that moves between a first position and a second position which is a position that is located further from the apparatus main body than the first position in an apparatus main body including a reading portion that reads a document, a biasing unit that biases the moving object in a direction of protrusion, and a biasing release unit that releases an action of the biasing force applied by the biasing unit to the moving object in a range from a third position which is a position between the first position and the second position to the second position.

According to the aspect, since the moving object moves in the direction of protrusion in response to the biasing force of the biasing unit, it is possible to suppress the jarring driving sound compared with a configuration in which the moving object is caused to protrude by utilizing a driving source such as a motor.

In addition, the biasing force of the biasing unit does not act on the moving object in response to the biasing release unit in a range in which the moving object moves from the third position to the second position, and therefore, it is possible to secure a degree of freedom of operation of the moving object.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
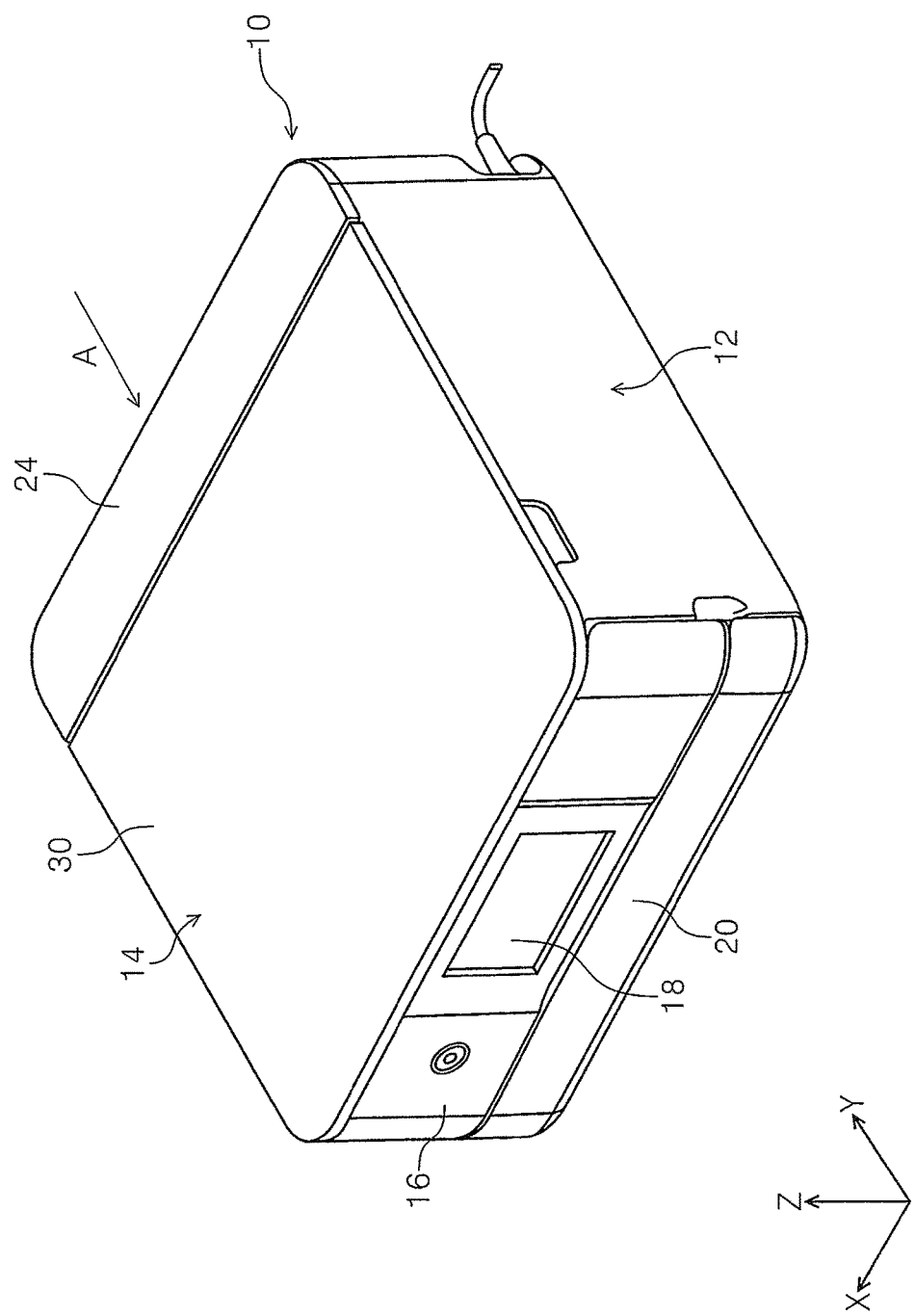
FIG. 1 is an outer appearance perspective view illustrating a state in which an operation portion is in a first posture in a printer according to the invention.

Embodiments of the present invention will be described below with reference to the drawings. Note that, where the configuration is the same in the respective embodiments, the same reference numerals are given, only the first example is described, and description is omitted for configurations in subsequent examples.

Figure 2:
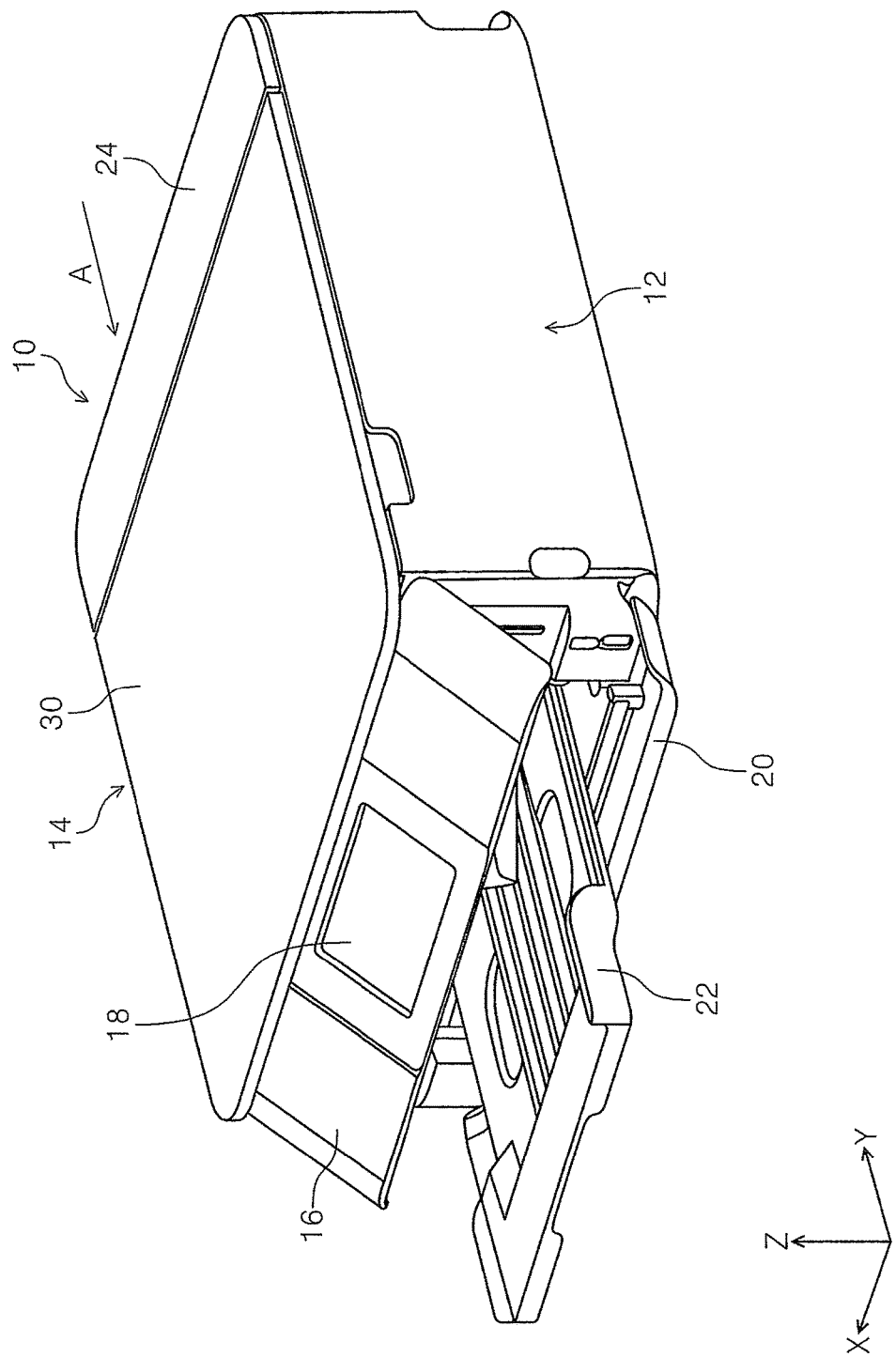
FIG. 2 is an outer appearance perspective view illustrating a state in which the operation portion is in a third posture in the printer according to the invention.
Figure 3:
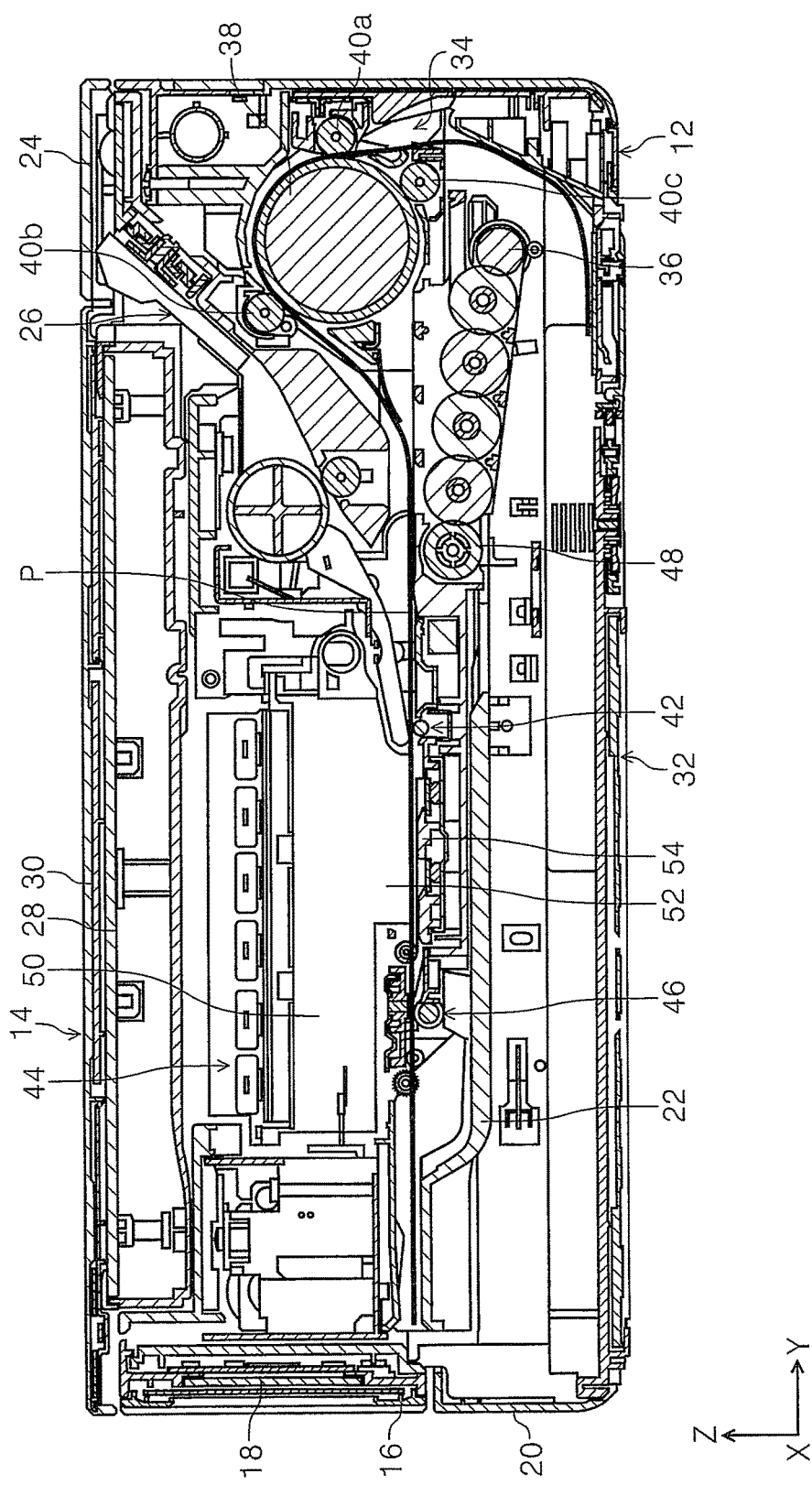
FIG. 3 is a side sectional view illustrating a feeding path of a medium in the printer according to the invention.
Figure 4:
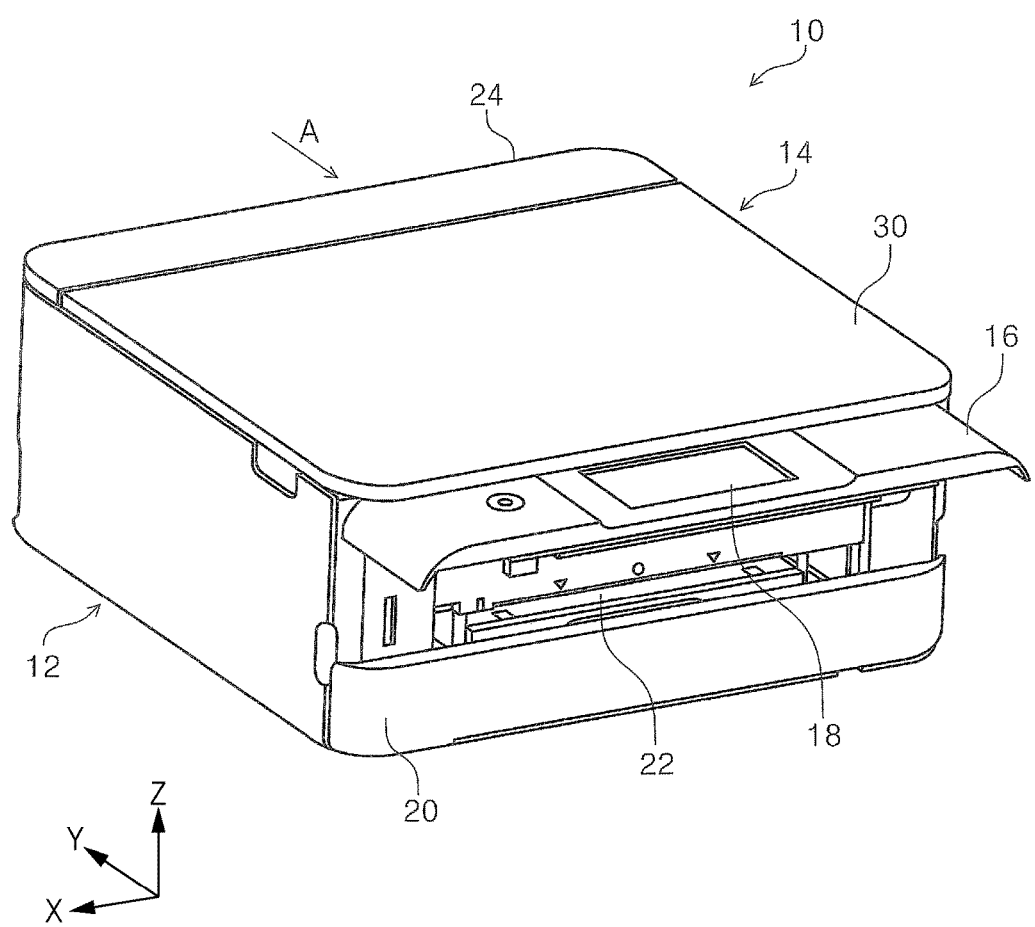
FIG. 4 is an outer appearance perspective view illustrating a state in which the operation portion is in a second posture in the printer according to the invention.
Figure 5:
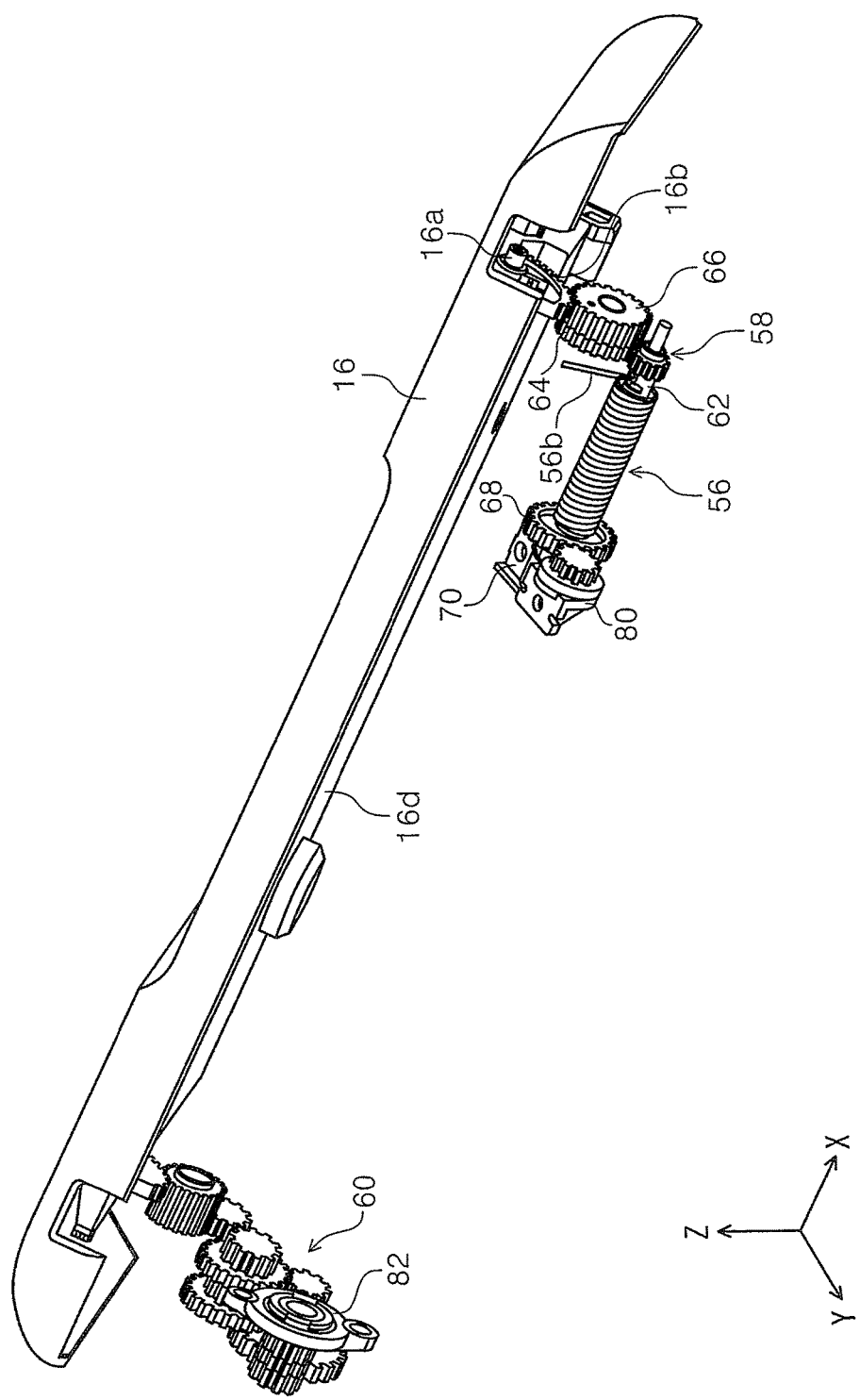
FIG. 5 is a perspective view illustrating the operation portion, biasing unit, biasing release unit, and posture holding unit according to the invention.
Figure 6:
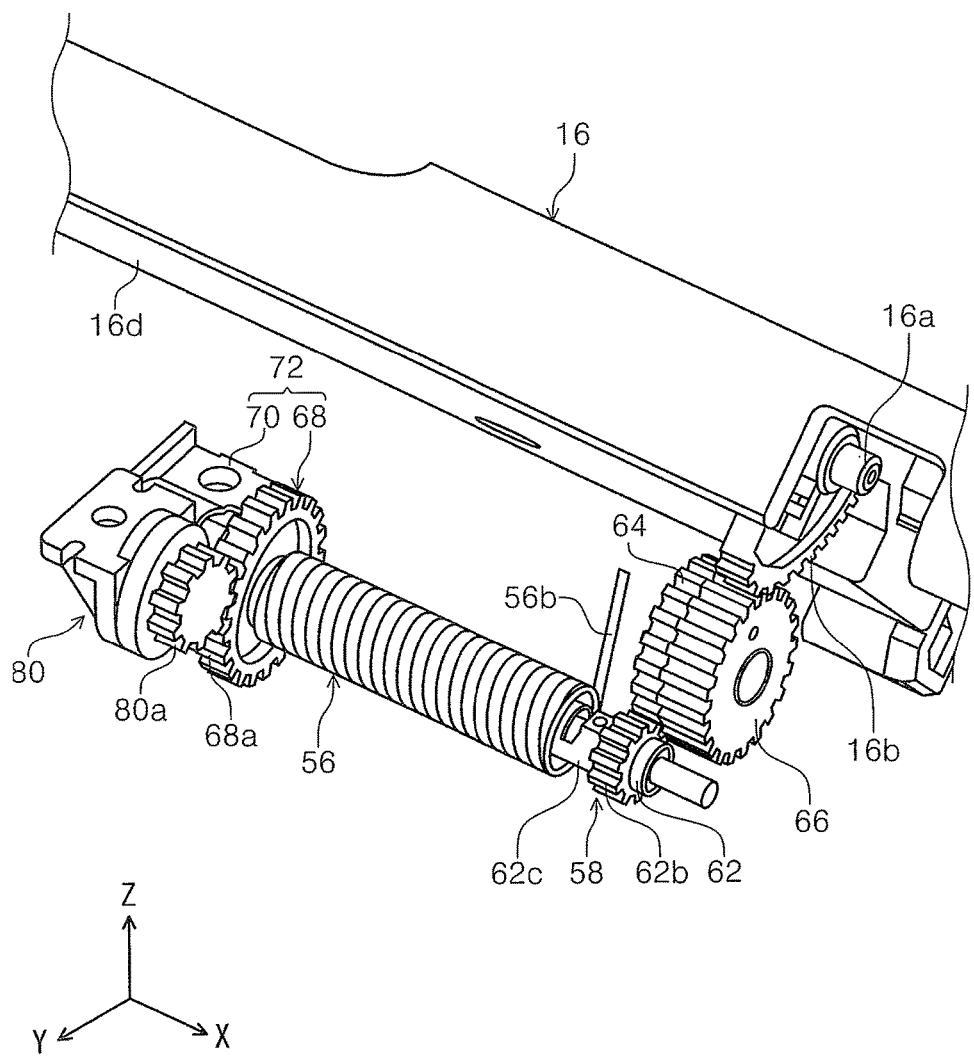
FIG. 6 is a perspective view illustrating the biasing unit and the biasing release unit according to the invention.

FIG. 1 is an outer appearance perspective view illustrating a state in which an operation portion is in a first posture in a printer according to the invention, FIG. 2 is an outer appearance perspective view illustrating a state in which the operation portion is in a third posture in the printer according to the invention, FIG. 3 is a side sectional view illustrating a feeding path of a medium in the printer according to the invention, FIG. 4 is an outer appearance perspective view illustrating a state in which the operation portion is in a second posture in the printer according to the invention, FIG. 5 is a perspective view illustrating the operation portion, biasing unit, biasing release unit, and posture holding unit according to the invention, and FIG. 6 is a perspective view illustrating the biasing unit and the biasing release unit according to the invention.

Figure 7:
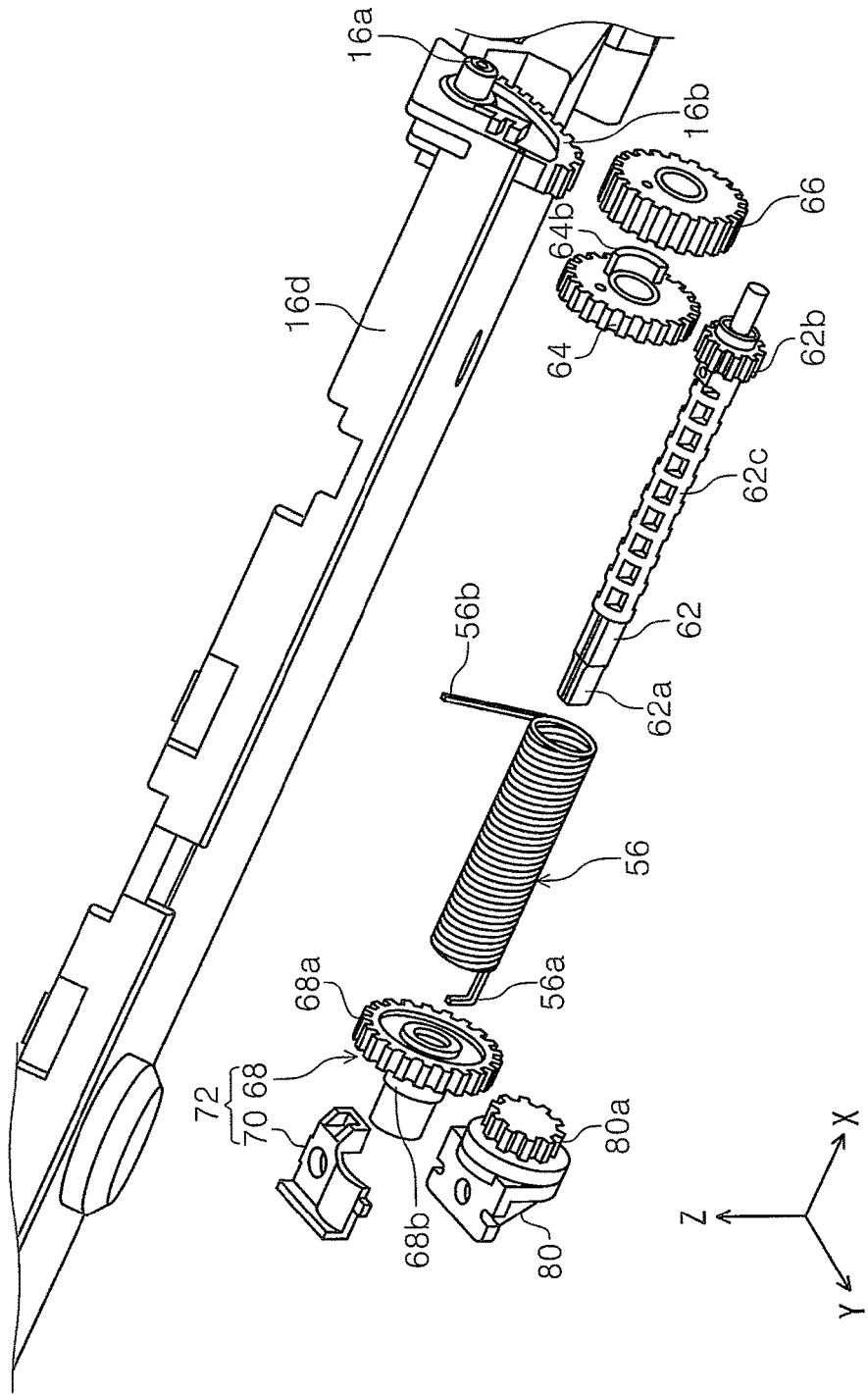
FIG. 7 is an exploded perspective view of the biasing unit and the biasing release unit according to the invention.
Figure 8:
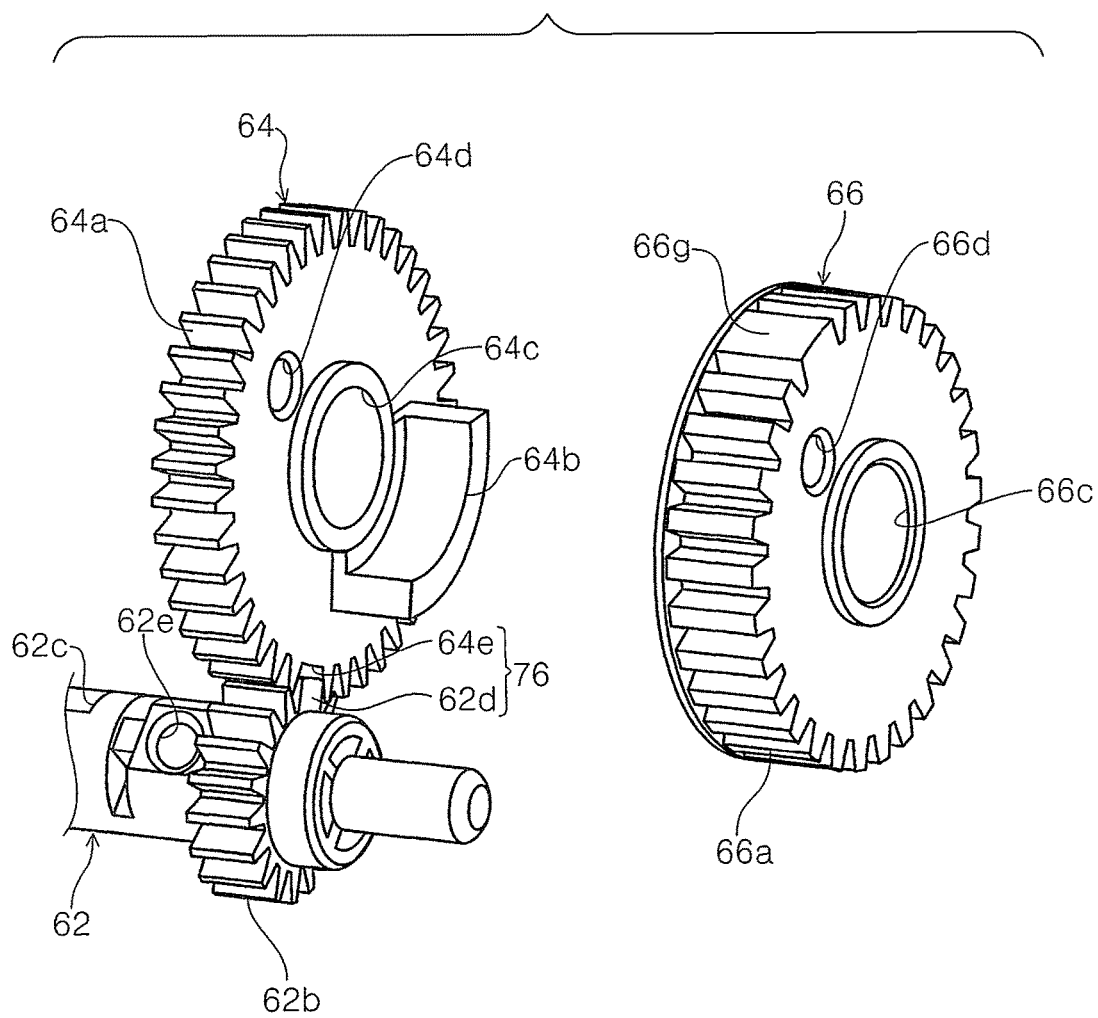
FIG. 8 is an exploded perspective view illustrating a structure of a first gear and a second gear.
Figure 9:
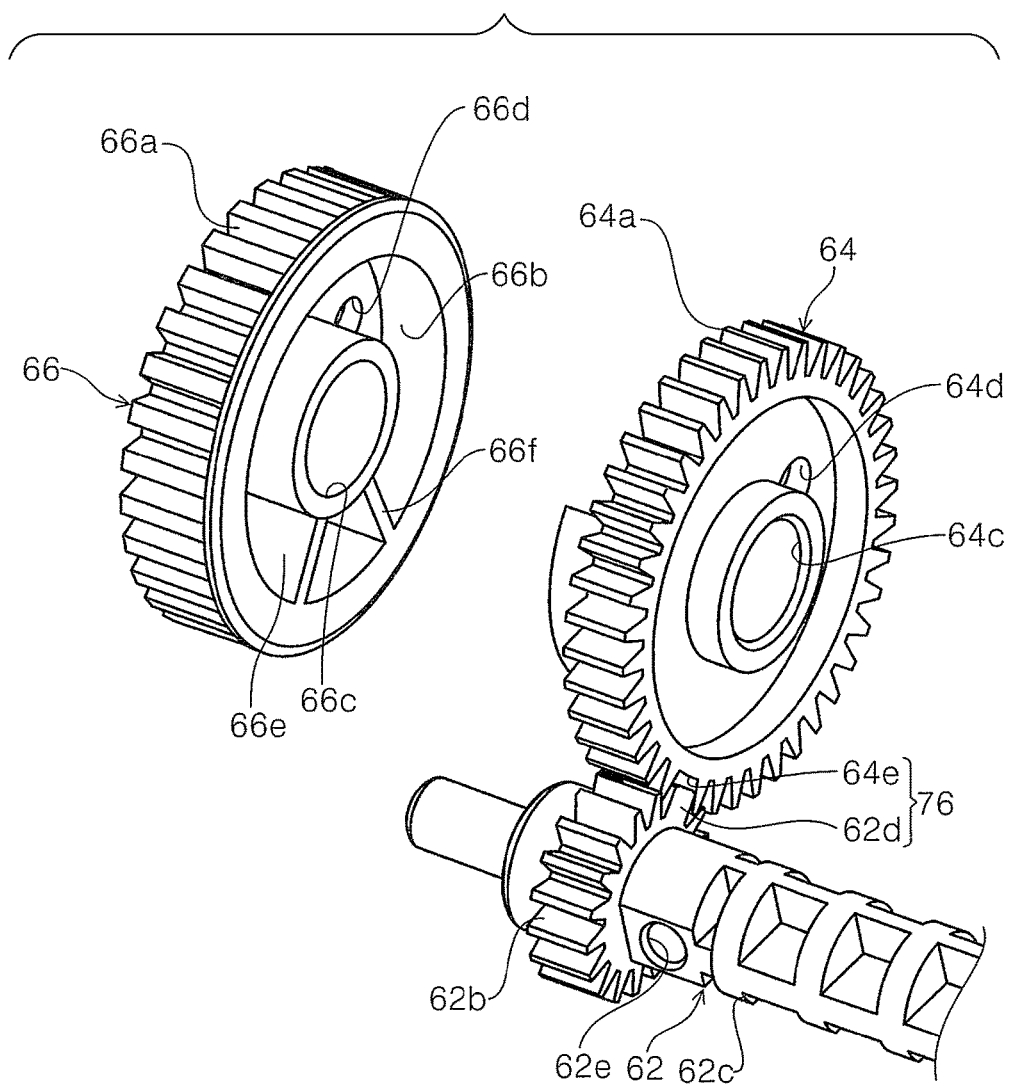
FIG. 9 is an exploded perspective view illustrating the structure of the first gear and the second gear.
Figure 10:
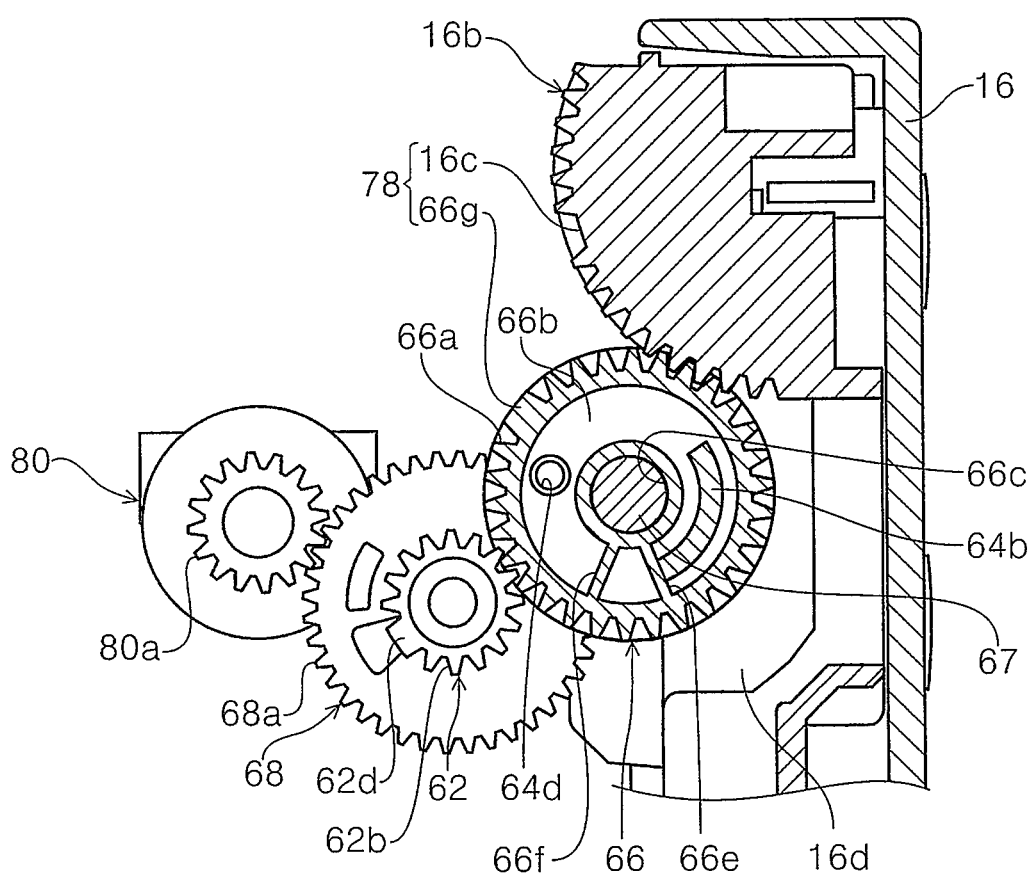
FIG. 10 is a side sectional view illustrating a relationship between the operation portion and the second gear when the operation portion takes the first posture.
Figure 11:
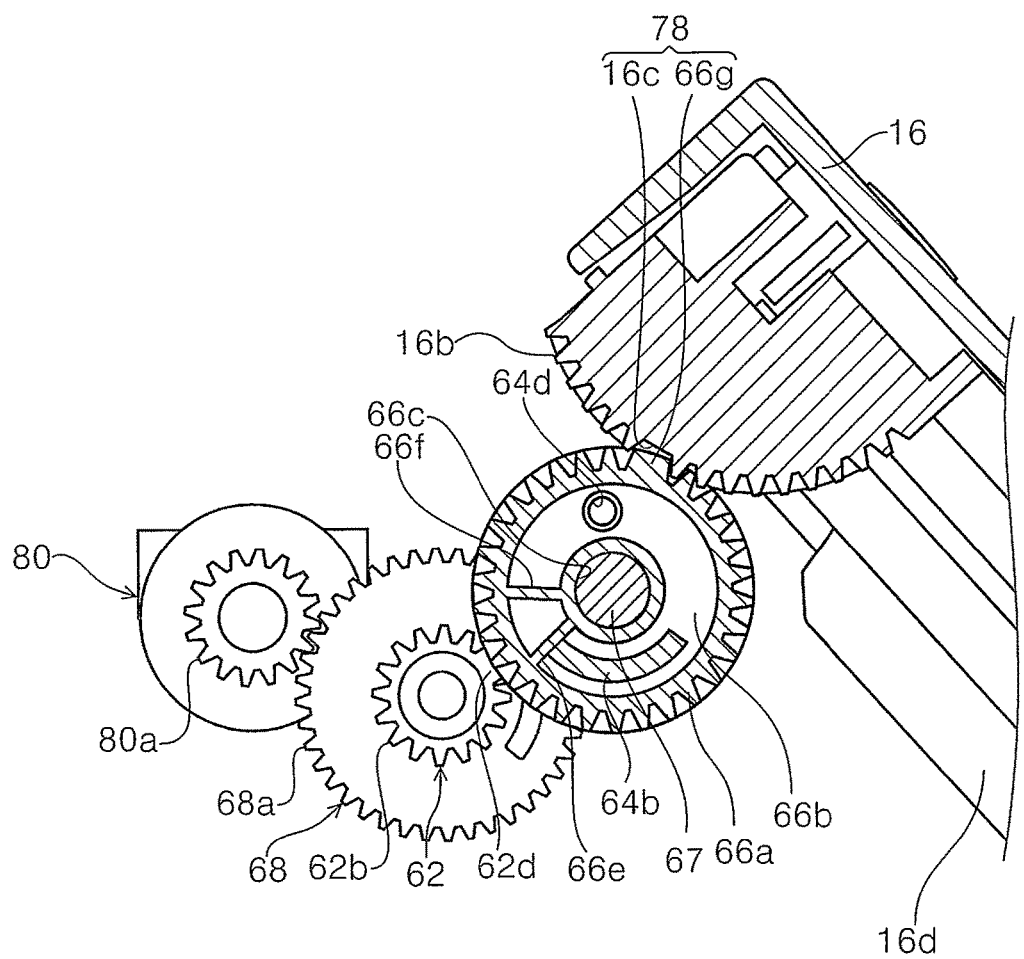
FIG. 11 is a side sectional view illustrating a relationship between the operation portion and the second gear when the operation portion takes the third posture.
Figure 12:
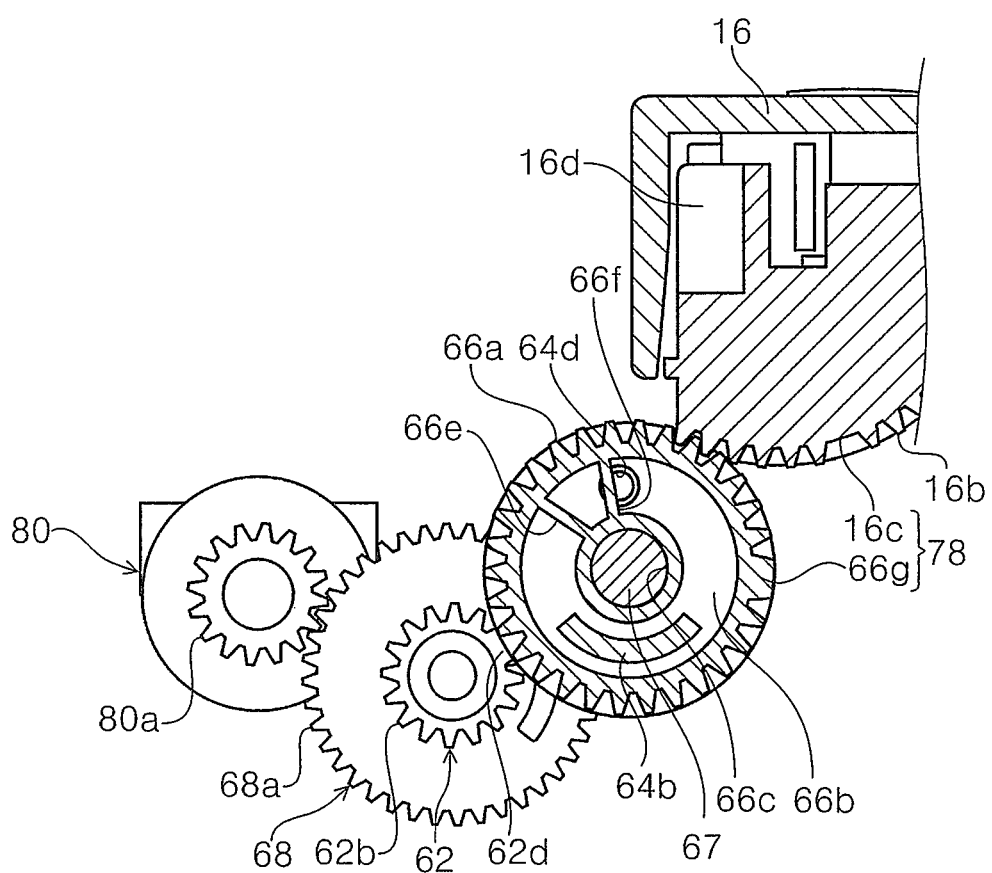
FIG. 12 is a side sectional view illustrating a relationship between the operation portion and the second gear when the operation portion takes the second posture.

In addition, FIG. 7 is an exploded perspective view of the biasing unit and the biasing release unit according to the invention, FIG. 8 is an exploded perspective view illustrating a structure of a first gear and a second gear, FIG. 9 is an exploded perspective view illustrating the structure of the first gear and the second gear, FIG. 10 is a side sectional view illustrating a relationship between the operation portion and the second gear when the operation portion takes the first posture, FIG. 11 is a side sectional view illustrating a relationship between the operation portion and the second gear when the operation portion takes the third posture, and FIG. 12 is a side sectional view illustrating a relationship between the operation portion and the second gear when the operation portion takes the second posture.

Figure 13:
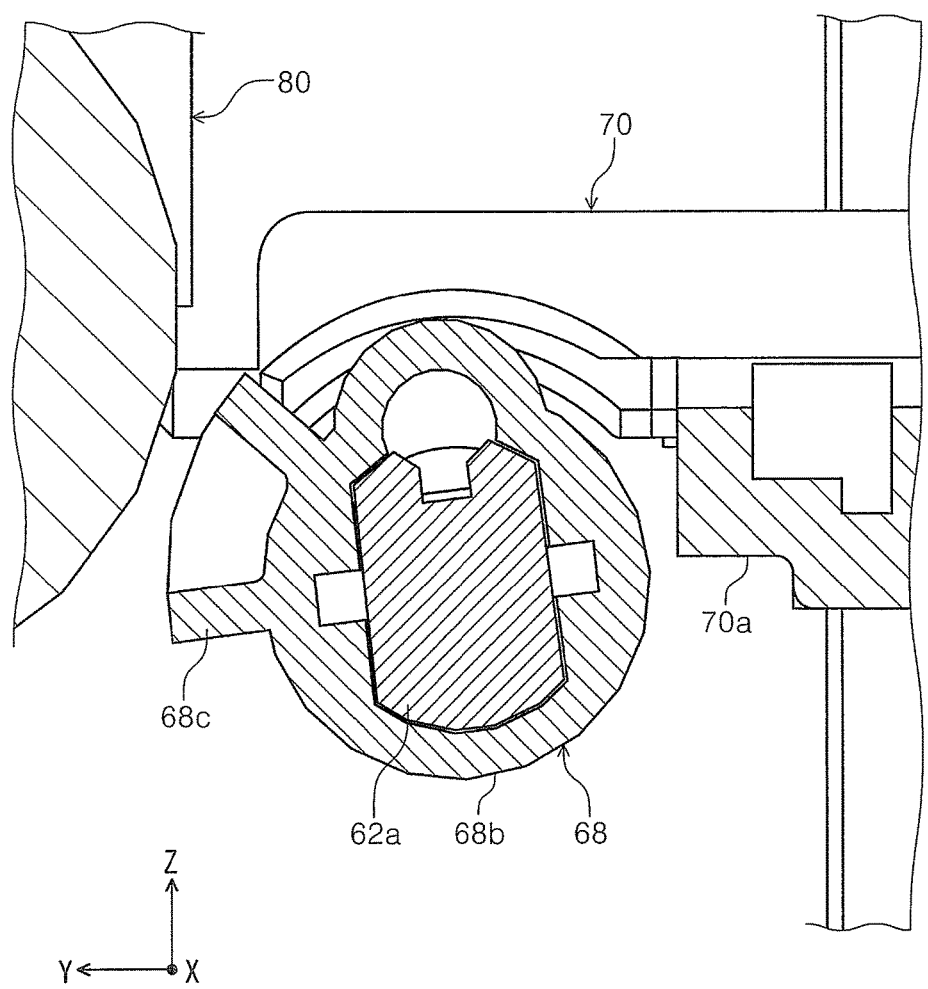
FIG. 13 is a side sectional view illustrating a state of a rotation stopping unit when the operation portion takes the first posture.
Figure 14:
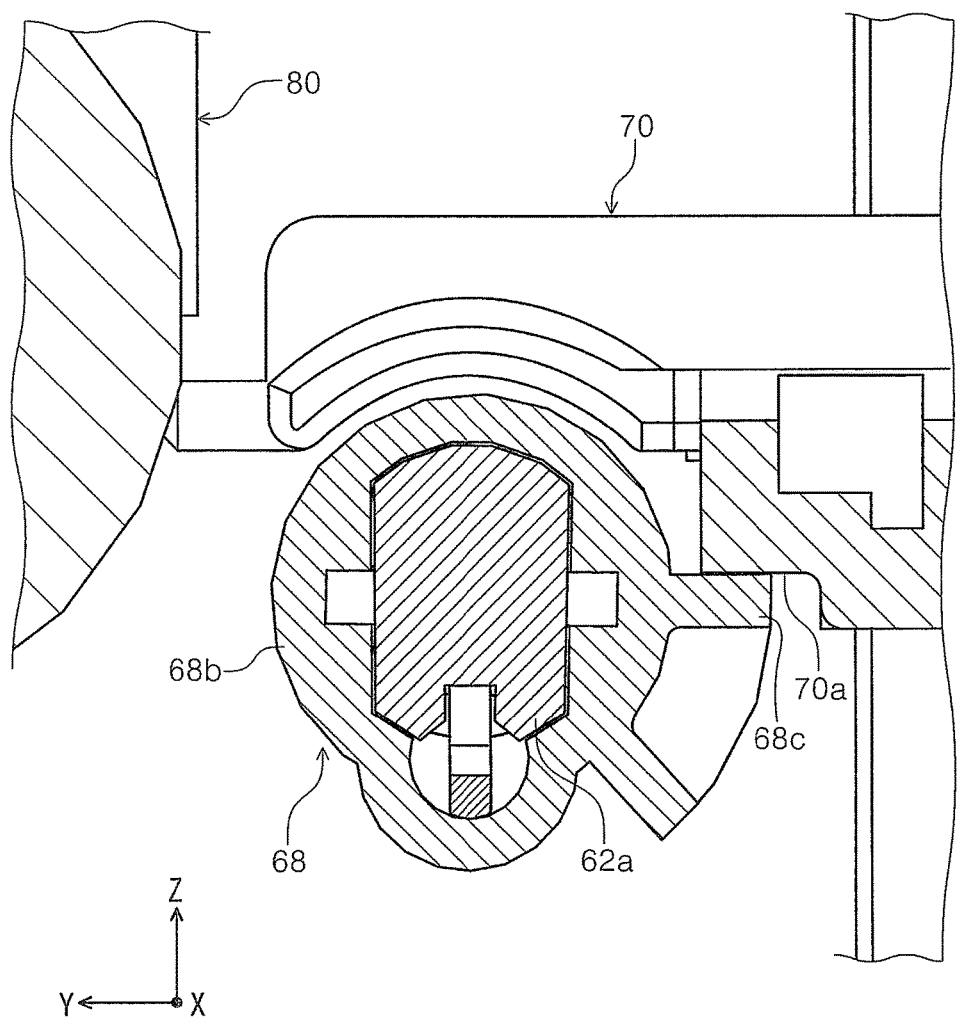
FIG. 14 is a side sectional view illustrating a state of the rotation stopping unit when the operation portion takes the third posture.
Figure 15:
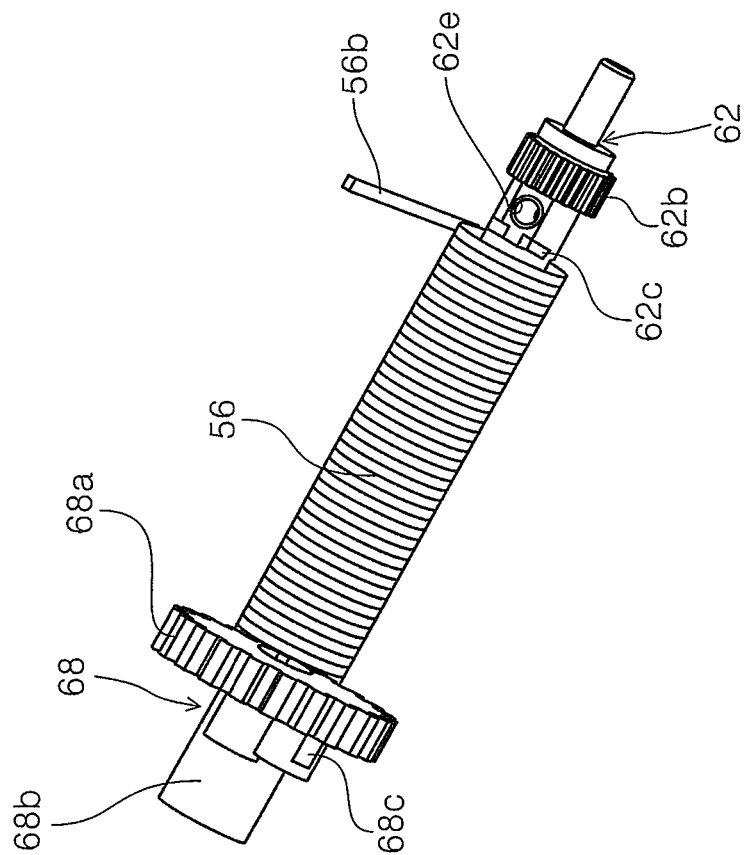
FIG. 15 is a perspective view illustrating a first state in an assembly process of the biasing unit and the biasing release unit according to the invention.
Figure 16:
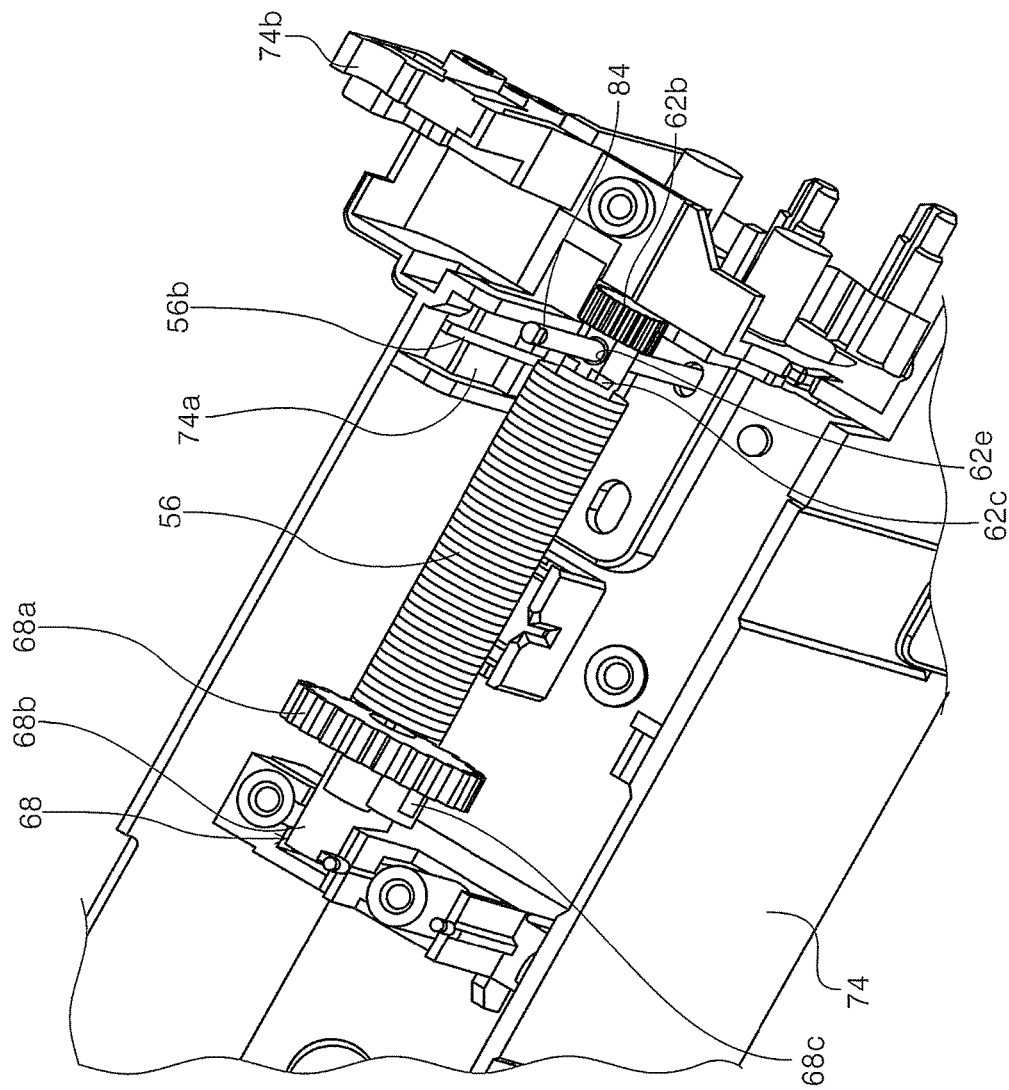
FIG. 16 is a perspective view illustrating a second state in the assembly process of the biasing unit and the biasing release unit according to the invention.
Figure 17:
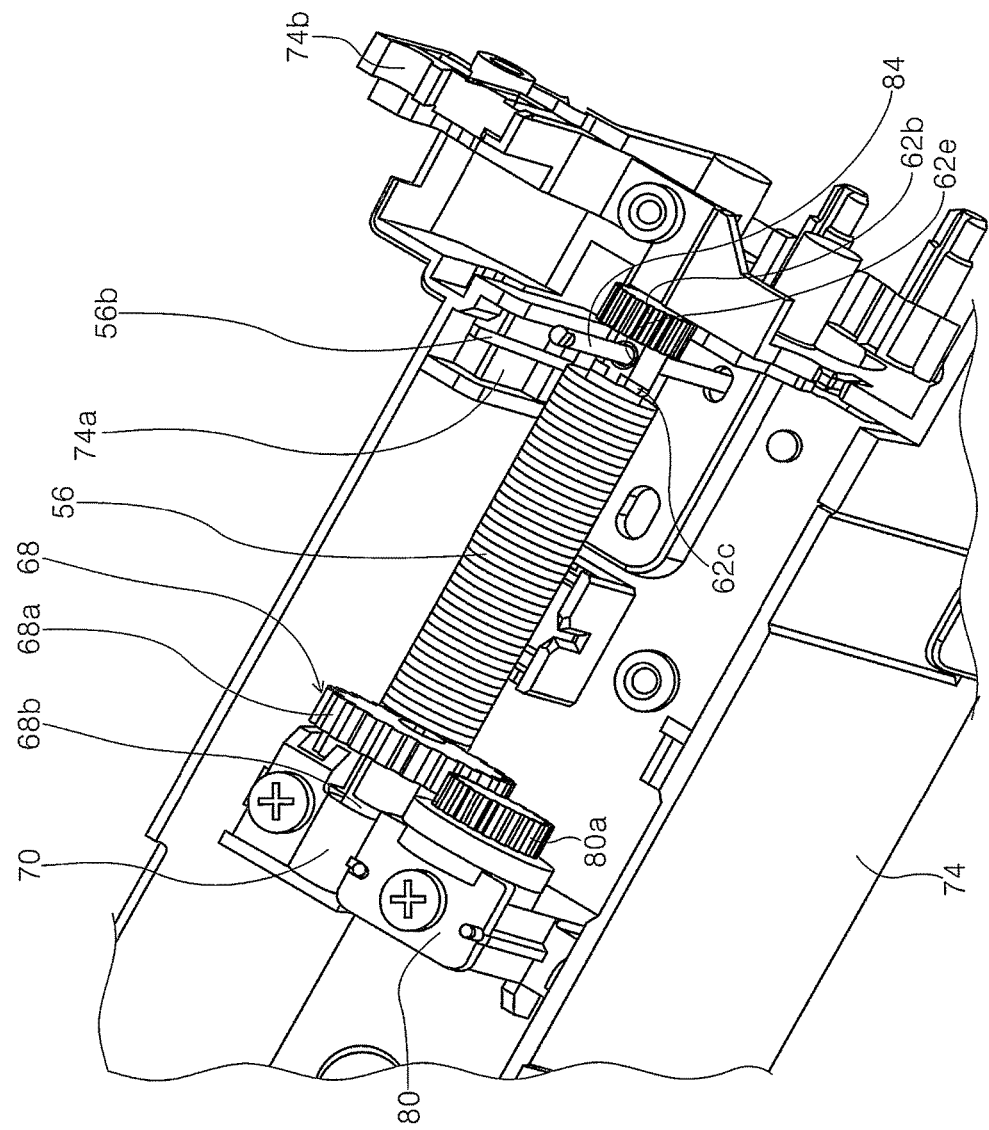
FIG. 17 is a perspective view illustrating a third state in the assembly process of the biasing unit and the biasing release unit according to the invention.
Figure 18:
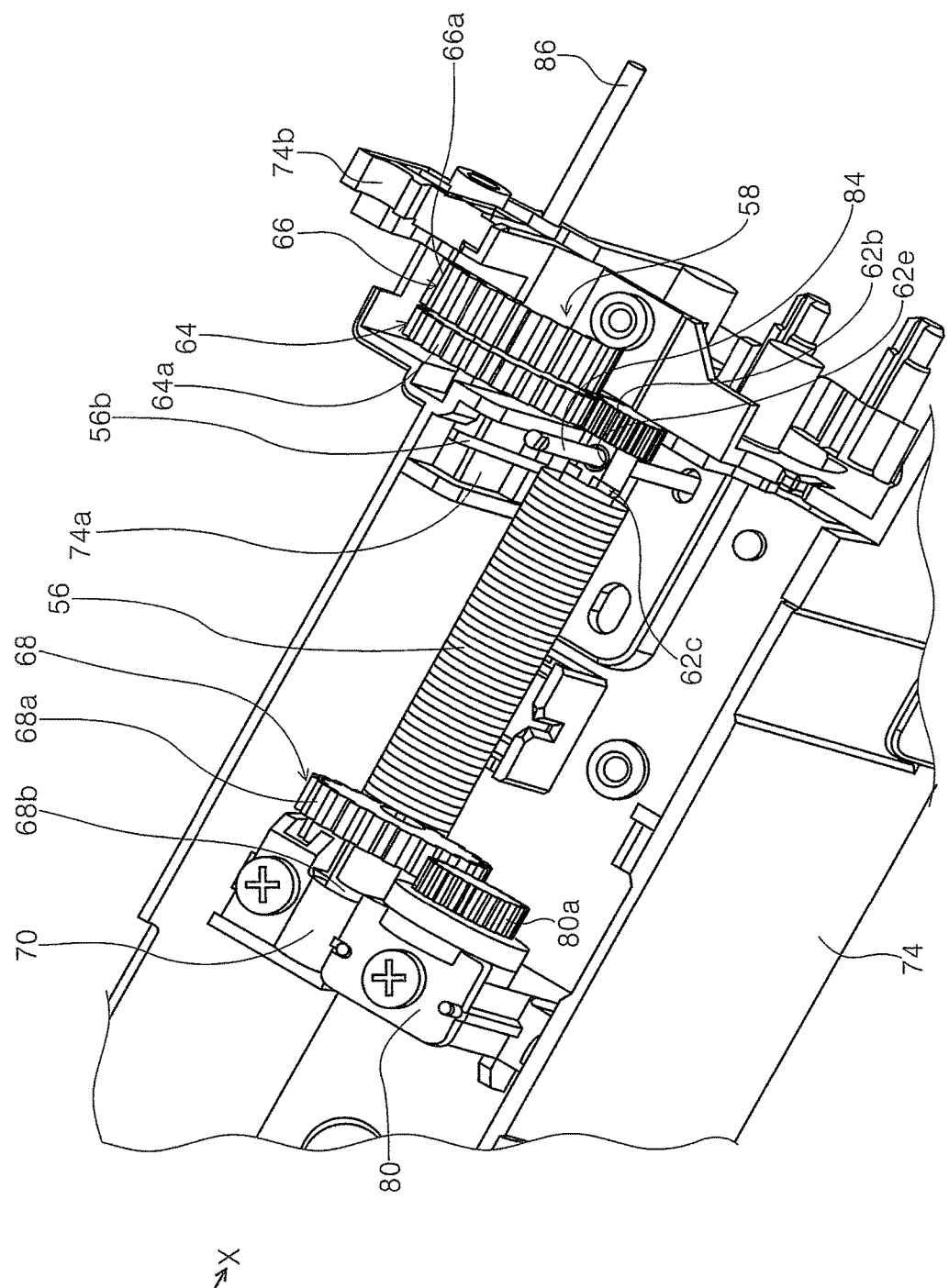
FIG. 18 is a perspective view illustrating a fourth state in the assembly process of the biasing unit and the biasing release unit according to the invention.

In addition, FIG. 13 is a side sectional view illustrating a state of a rotation stopping unit when the operation portion takes the first posture, FIG. 14 is a side sectional view illustrating a state of the rotation stopping unit when the operation portion takes the third posture, FIG. 15 is a perspective view illustrating a first state in an assembly process of the biasing unit and the biasing release unit according to the invention, FIG. 16 is a perspective view illustrating a second state in the assembly process of the biasing unit and the biasing release unit according to the invention, FIG. 17 is a perspective view illustrating a third state in the assembly process of the biasing unit and the biasing release unit according to the invention, and FIG. 18 is a perspective view illustrating a fourth state in the assembly process of the biasing unit and the biasing release unit according to the invention.

Figure 19:
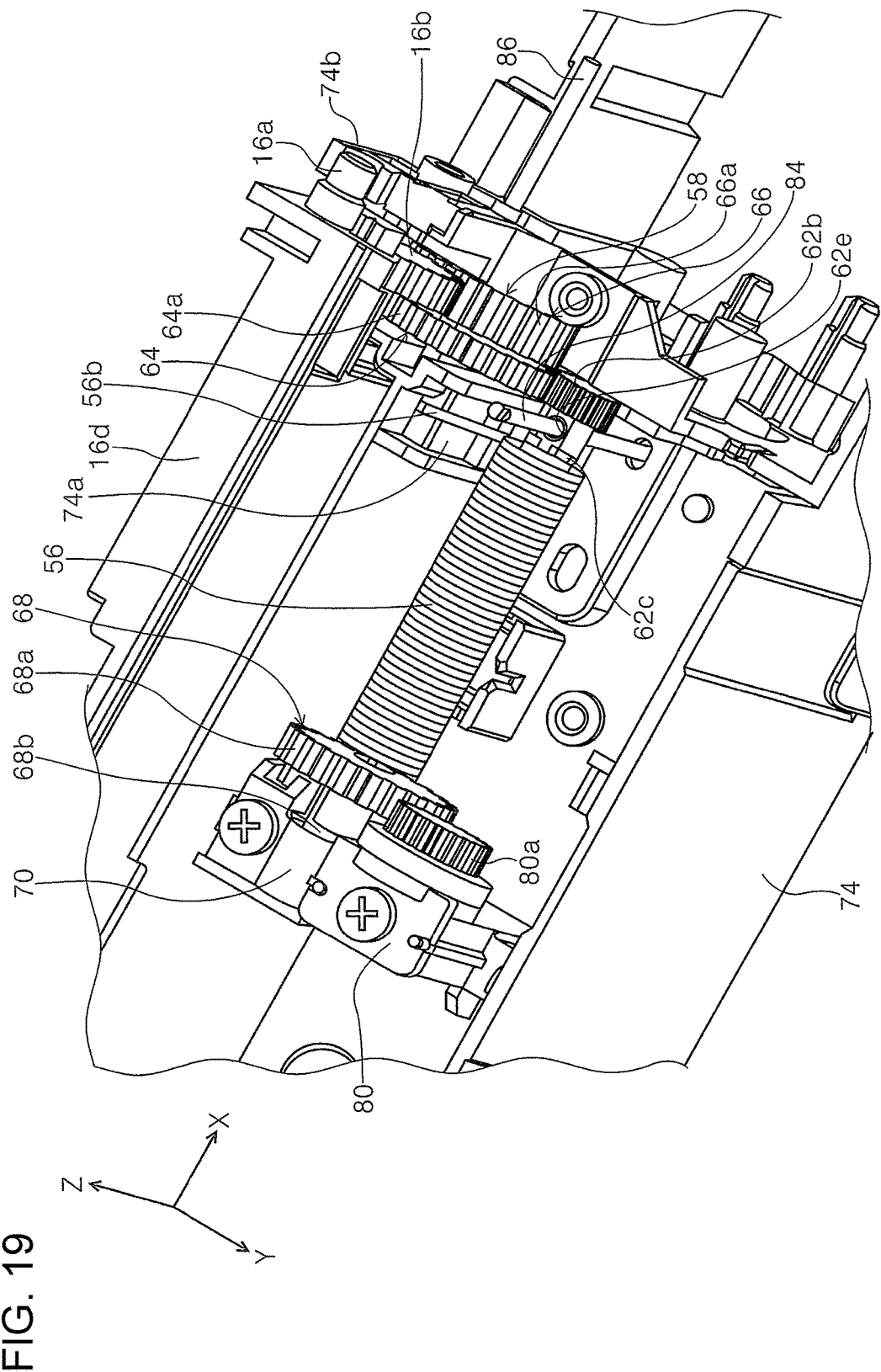
FIG. 19 is a perspective view illustrating a fifth state in the assembly process of the biasing unit and the biasing release unit according to the invention.
Figure 20:
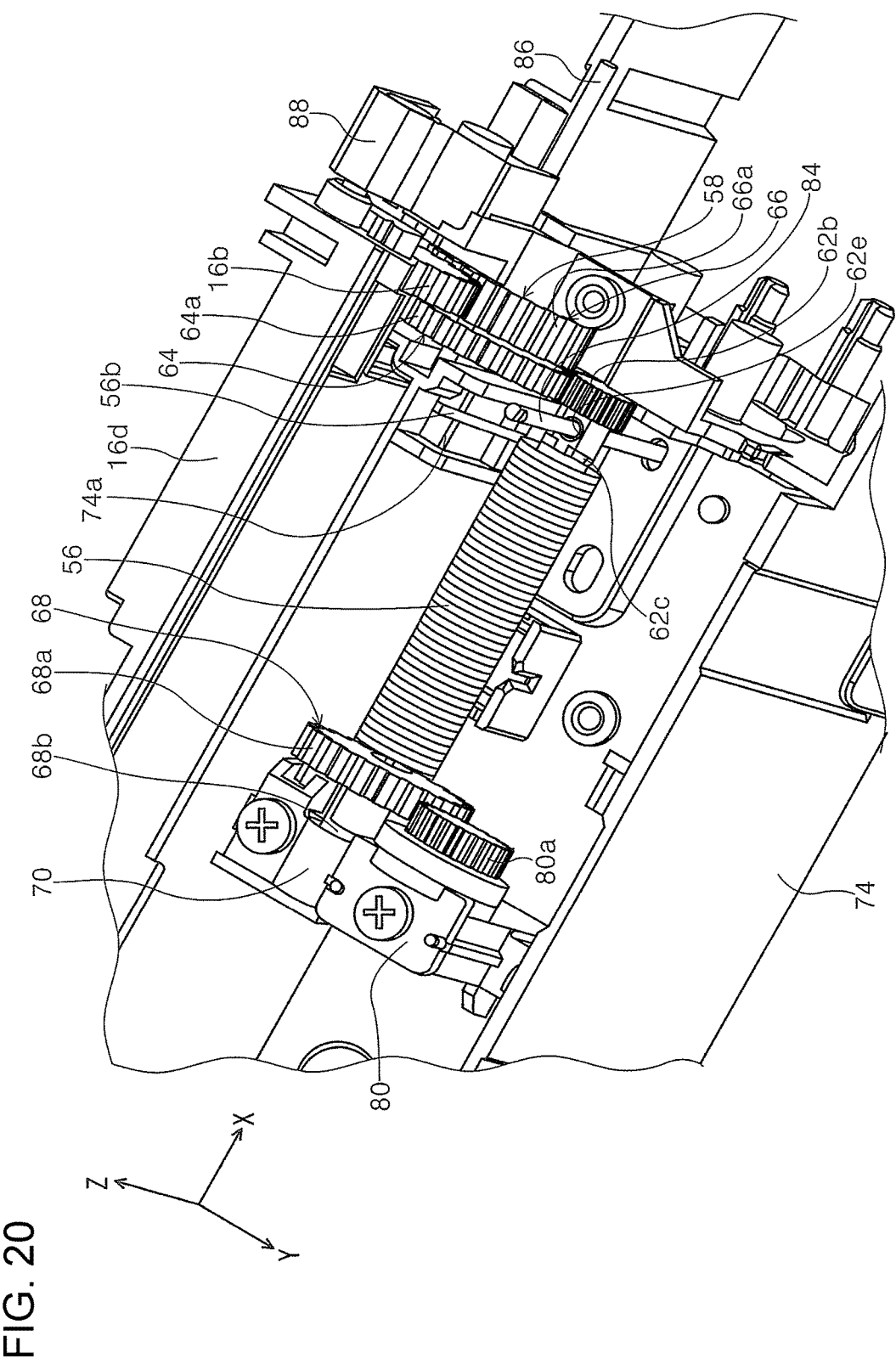
FIG. 20 is a perspective view illustrating a sixth state in the assembly process of the biasing unit and the biasing release unit according to the invention.
Figure 21:
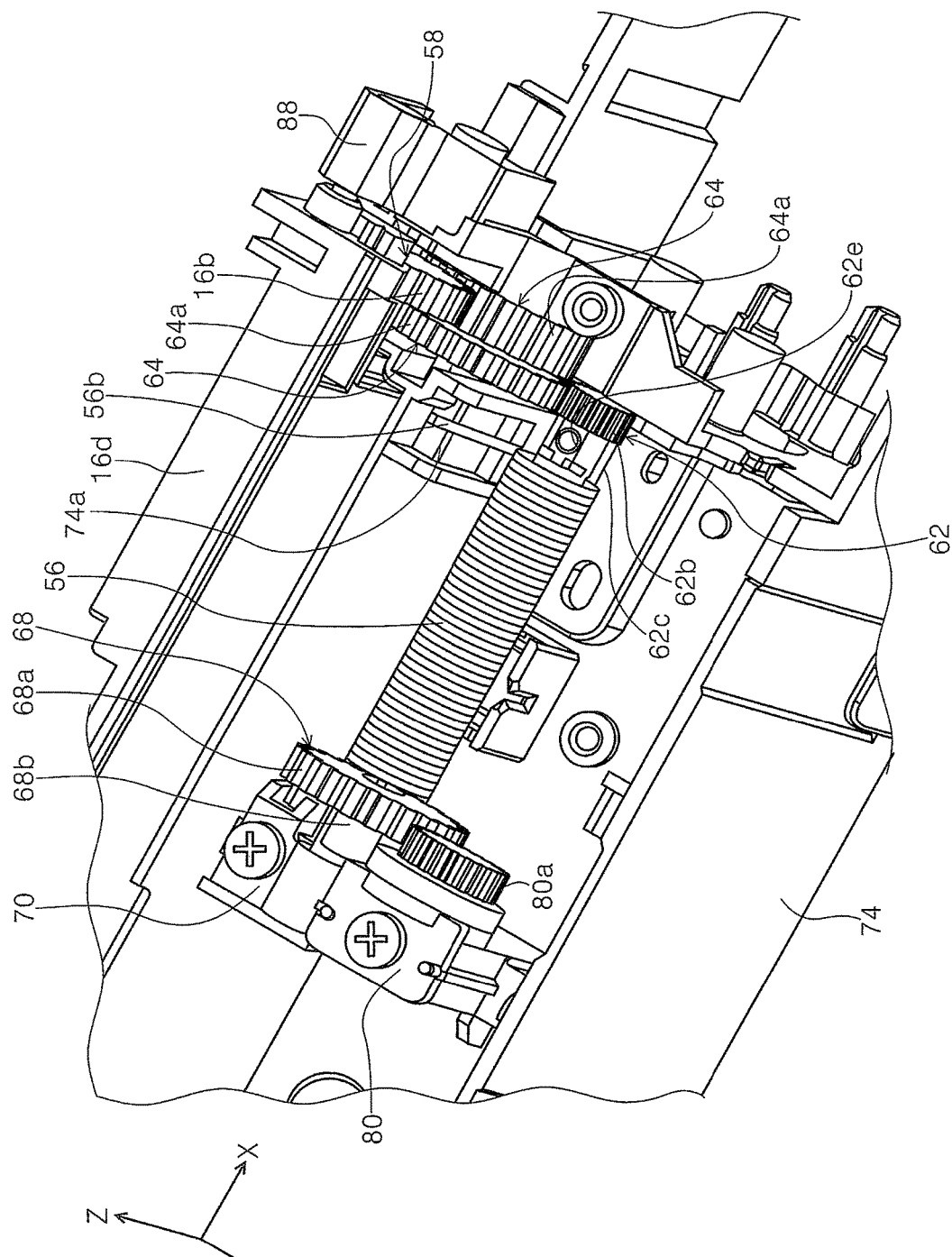
FIG. 21 is a perspective view illustrating a seventh state in the assembly process of the biasing unit and the biasing release unit according to the invention.

In addition, FIG. 19 is a perspective view illustrating a fifth state in the assembly process of the biasing unit and the biasing release unit according to the invention, FIG. 20 is a perspective view illustrating a sixth state in the assembly process of the biasing unit and the biasing release unit according to the invention, and FIG. 21 is a perspective view illustrating a seventh state in the assembly process of the biasing unit and the biasing release unit according to the invention.

In addition, in the X-Y-Z coordinates indicated in each drawing, the X direction indicates the main scanning direction (movement direction) of a carriage, that is, a width direction of the recording apparatus, the Y direction indicates the depth direction of the recording apparatus, and the Z direction indicates the apparatus height direction. Note that, in each drawing, the +X direction side is the apparatus left side, the -X direction side is the apparatus right side, the -Y direction is the apparatus front surface side, the +Y direction side is the apparatus rear surface side, the +Z direction side is the apparatus upward side, and the -Z direction side is the apparatus downward side.

EXAMPLE

Summary of Printer

With reference to FIG. 1, a printer 10 is provided with an apparatus main body 12 and a scanner portion 14 as a "reading portion" provided in an upper portion of the apparatus main body 12. An operation portion 16 is provided to be rotatable with respect to the apparatus main body 12 as a "rotating body" or a "moving object" on the apparatus front surface side of the apparatus main body 12. A display unit 18 such as a display panel is provided on the operation portion 16.

In the example, the operation portion 16 is configured so as to rotate toward the apparatus front surface side of the apparatus main body 12 around a rotary shaft 16a (refer to FIGS. 5 to 7). In the example, with respect to the apparatus main body 12, the operation portion 16 is able to switch from the first posture (refer to FIG. 1) as a "first position", the second posture (refer to FIG. 4) as the "second position", and the third posture (refer to FIG. 2) as the "third position". Note that, the operation portion 16 will be described later in detail.

A cover 20 is disposed below the operation portion 16 on the apparatus front surface side of the apparatus main body 12. In addition, a paper discharge tray 22 is provided in the apparatus main body 12. The paper discharge tray 22 is configured to be switchable between a state (refer to FIG. 1) of being accommodated within the apparatus main body 12 and a state (refer to FIG. 2) of being provided on the apparatus front surface side of the apparatus main body 12.

In addition, a cover 24 is attached to an upper portion on a rear surface side of the printer main body 12 so as to be rotatable. The cover 24 is configured to be switchable between a state of being closed with respect to the apparatus main body 12 indicated in FIG. 1 and a state (not illustrated) of being open with respect to the apparatus main body 12. When the cover 24 is in the open state with respect to the apparatus main body 12, it is possible to insert a medium into the apparatus main body 12 in an orientation of arrow A, and the inserted medium is guided along an inclined medium guiding path 26 indicated in FIG. 3 and sent to a transport direction downstream side.

Scanner Portion

In addition, the scanner portion 14 is provided on the upper portion of the apparatus main body 12 as shown in FIG. 3. A document stand 28 is provided on the scanner portion 14. The document stand 28 is formed using, for example, a transparent glass plate and is configured to be able to place the document thereon.

In addition, a cover 30 is provided on the scanner portion 14 to open and close the upper portion of the scanner portion 14. The cover 30 covers the document stand 28 in a closed state (refer to FIGS. 1 and 2) and exposes the document stand 28 in the open state (not illustrated). That is, reading of the document on the document stand 28 is possible by the cover 30 rotating with respect to the document stand 28 in the open state, exposing the document stand 28, setting the document on the upper surface thereon, and closing the cover 30. Note that, a reading unit (not illustrated) which is able to read the document that is set on the document stand 28 is provided below the document stand 28.

Medium Transport Path

Next, a medium accommodating portion 32 that accommodates the medium is provided on a lower portion of the apparatus main body 12 referenced in FIG. 2. In the example, the medium accommodating portion 32 is configured to be detachably attached with respect to the apparatus main body 12 from the apparatus front surface side with respect to the apparatus main body 12. In addition, the cover 20 is rotatably attached with respect to the medium accommodating portion 32. In addition, a thick solid line denoted by reference numeral P indicates a guide path of the medium that is transported along a medium transport path 34 from the medium accommodating portion 32 to the paper discharge tray 22.

In the example, a pickup roller 36, an inverted roller 38, driven rollers 40a, 40b, and 40c, a transport roller pair 42, a recording portion 44, and a discharge roller pair 46 are provided in order along the medium transport path 34 within the apparatus main body 12. The pickup roller 36 is disposed above the medium accommodating portion 32 to be rotatable around a rotary shaft 48. Then, the medium that is fed from the medium accommodating portion 32 by the pickup roller 36 is nipped by the inverted roller 38 and the driven rollers 40a and 40b and transported to the transport roller pair 42.

The transport roller pair 42 transports the medium to the recording portion 44. In the example, the recording portion 44 is provided with a carriage 50, a recording head 52, and a medium guiding member 54. In the example, the carriage 50 is configured to be able to reciprocate in the apparatus width direction. Then, the recording head 52 is provided on the lower portion of the carriage 50. In the example, the recording head 52 is configured so as to discharge ink toward an apparatus height direction lower side.

In addition, the medium guiding member 54 is provided in a region facing the recording head 52 below the recording head 52. The medium guiding member 54 moves the recording head 52 and is disposed in a gap with the recording head 52. The medium guiding member 54 supports the lower surface of the medium (surface on the opposite side from the recording surface) that is able to be transported in the region facing the recording head 52 by the transport roller pair 42. Then, the recording head 52 discharges ink onto the medium that is supported by the medium guiding member 54 and performs recording on the recording surface of the medium.

Then, the medium on which recording is performed is nipped by the discharge roller pair 46 that is provided on the transport direction downstream side of the recording portion 44 and is discharged toward the paper discharge tray 22 which protrudes toward the apparatus front surface side.

In addition, the cover 24 is opened, and the medium that is inserted from above the printer 10 is guided on the medium guiding path 26 and is transported to the recording portion 44, and recording is performed on the recording portion 44. Then, after recording is performed, the medium is discharged to the paper discharge tray 22.

In addition, after recording is executed on a first surface (recording surface) of the medium in the recording portion 44, in a case where recording is performed on a second surface (lower surface) on the opposite side from the first surface, the transport roller pair 42 is inverted, and the medium is transported to the transport direction upstream side. The medium that is transport to the transport direction upstream side is nipped by the inverted roller 38 and the driven roller 40c. Then, the first surface and the second surface of the medium are inverted by the inverted roller 38, the medium is transported again to the recording portion 44, and recording is executed on the second surface in the recording portion 44, then the medium is discharged toward the paper discharge tray 22.

Operation Portion

With reference to FIGS. 1, 2, and 4, the operation portion 16 according to the example has a configuration that is switchable between the first posture (FIG. 1) that is the closed posture with respect to the apparatus main body 12, the second posture (FIG. 4) that is a totally open state rotating to the apparatus depth direction front side as the "opening direction" with respect to the apparatus main body 12 from the first posture, and the third posture (FIG. 2) that is a posture between the first posture and the second posture. Note that, in the example, for example, the operation portion 16 is switched from the first posture to the third posture in response to the biasing force of the biasing unit 56 which will be described later, and the switching from the third posture to the second posture is set to be operated by a user.

Note that, in the example, for example, the operation portion 16, the second posture is a posture that is rotated by approximately 90 degrees to the apparatus depth direction front side with respect to the first posture, and the third posture is set to a posture rotated by approximately 45 degrees to the apparatus depth direction front side with respect to the first posture.

Biasing Unit and Biasing Release Unit

Then, switching unit that switches the posture of the operation portion 16 will be described with reference to FIGS. 5 to 14, and 21. Referring to FIG. 5, the biasing unit 56 and a biasing release unit 58 are provided in the apparatus width direction left side end portion (+X axis direction side in FIG. 5) of the operation portion 16. In addition, posture holding unit 60 is provided in the apparatus width direction right side end portion (−X axis direction side in FIG. 5) of the operation portion 16.

In the example, the operation portion 16 is disposed on the apparatus depth direction front side of the apparatus main body 12. Then, the biasing unit 56, the biasing release unit 58, and the posture holding unit 60 are disposed in a region between the operation portion 16 and the recording portion 44, that is, the carriage 50 in the apparatus depth direction in FIG. 3.

The biasing unit 56 and the biasing release unit 58 will be described with reference to FIGS. 6 and 7. In the example, the biasing unit 56 is configured, for example, as a torsion spring. In addition, the biasing release unit 58 is provided with a drive shaft 62, a first gear 64, a second gear 66, a third gear 68, and a bearing member 70. In addition, in the example, the third gear 68 and the bearing member 70 configure a rotation stopping unit 72.

As shown in FIG. 7, in the drive shaft 62, one end is configured as an engaging portion 62a, another end is configured as a drive gear 62b, and between the engaging portion 62a and the drive gear 62b is configured as a shaft portion 62c. Then, in the example, the drive shaft 62 is inserted into the biasing unit 56 that is configured, for example, as a torsion spring. As shown in FIG. 6, the biasing unit 56 in the apparatus width direction is disposed between the engaging portion 62a and the drive gear 62b, that is, in the shaft portion 62c.

In addition, the third gear 68 is attached to the engaging portion 62a. Then, when the drive shaft 62 rotates, the third gear 68 and the drive shaft 62 rotate together in the same direction. In addition, one end portion 56a of the biasing unit 56 engages with the third gear.

In addition, referring to FIG. 21, in the example, the drive shaft 62 and the third gear 68 are supported to be rotatable on a support member 74 that is disposed on the apparatus depth direction front side in the apparatus main body 12. Then, another end portion 56b of the biasing unit 56 engages with an engaging portion 74a of the support member 74. That is, the engaging portion 74a of the support member 74 receives the other end portion 56b of the biasing unit 56.

In the example, when the drive shaft 62 and the third gear 68 are rotated in a clockwise direction in FIG. 10, elastic energy of the biasing unit 56 that is the torsion spring is increased. In contrast, when the drive shaft 62 and the third gear 68 are rotated in a counter clockwise direction in FIG.

10, elastic energy of the biasing unit 56 that is the torsion spring is released and reduced.

The drive gear 62b meshes with the first gear 64 as indicated in FIG. 6. With reference to FIGS. 8 and 9, the first gear 64 is provided with a gear portion 64a, a convex shape portion 64b, a bearing 64c, and a phase setting hole 64d. The bearing 64c is formed as a through hole in a center portion of the first gear 64. In addition, the phase setting hole 64d passes through the first gear 64 along an axis line direction of the first gear 64. The convex shape portion 64b is formed on the surface on a side facing the second gear 66 in the first gear 64.

Furthermore, a shape in which some teeth are cut in a peripheral direction of the gear portion 64a and a cutout portion 64e in which a gap between teeth is set to be larger than a gap between other teeth are formed. Meanwhile, a phase setting tooth 62d that is set to have a larger tooth width than another tooth is formed on the drive gear 62b of the drive shaft 62. Then, the phase setting tooth 62d and the cutout portion 64e mesh and a meshing phase is set between the drive gear 62b and the first gear 64. That is, in the example, the phase setting tooth 62d and the cutout portion 64e configure a first phase setting portion 76.

The second gear 66 is provided with a gear portion 66a, a concave shape portion 66b, a bearing 66c, and a phase setting hole 66d. The bearing 66c is formed as a through hole in a center portion of the second gear 66. In addition, the phase setting hole 66d passes through the first gear 64 along the axis line direction of the second gear 66. The concave shape portion 66b is formed on the surface on a side facing the first gear 64 in the second gear 66.

Note that, in the example, a shaft member 67 (refer to FIGS. 10 to 12) is inserted into the bearing 64c of the first gear 64 and the bearing 66c of the second gear 66. Then, the bearing 64c of the first gear 64 and the bearing 66c of the second gear 66 are each rotatable about the shaft member 67. Note that, illustration of the shaft member 67 is omitted in FIGS. 5 to 9. In addition, in a state in which the biasing release unit 58 is assembled as shown in FIG. 6, the convex shape portion 64b of the first gear 64 is inserted in the concave shape portion 66b in the second gear 66.

Here, a relationship between the convex shape portion 64b and the concave shape portion 66b will be further described with reference to FIGS. 10 to 12. Note that, FIG. 10 indicates a state of the first posture in operation portion 16, FIG. 11 indicates a state of the second posture of the operation portion 16, and FIG. 12 indicates a state of the third posture of the operation portion 16.

As shown in FIGS. 9 and 10, the concave shape portion 66b is provided along a circumferential direction of the second gear 66. Then, partition walls 66e and 66f are formed on both ends of the concave shape portion 66b. In the example, the convex shape portion 64b is able to move between the partition wall 66e and the partition wall 66f within the concave shape portion 66b.

That is, the convex shape portion 64b is configured to be able to relatively move in a direction around the axis of the first gear 64 and the second gear 66 with respect to the concave shape portion 66b. Accordingly, the concave shape portion 66b is configured as a clearance between the first gear 64 and the second gear 66 in which the second gear 66 is able to rotate independently from the first gear 64.

In addition, a phase setting tooth 66g that is set to have a larger tooth width than another tooth is formed on the gear portion 66a. In the example, the gear portion 16b is provided on an apparatus width direction left side end portion of the operation portion 16 as the "meshing portion" that meshes with the second gear 66. Then, a shape in which some teeth are cut in a peripheral direction of the gear portion 16b and a cutout portion 16c in which a gap between teeth is set to be larger than a gap between other teeth are formed in the gear portion 16b.

Then, the phase setting tooth 66g and the cutout portion 16c mesh and a meshing phase between the gear portion 16b of the operation portion 16 and the second gear 66 is determined. That is, in the example, the phase setting tooth 66g and the cutout portion 16c configure a second phase setting portion 78 as the "phase setting portion".

Referring to FIG. 10, the operation portion 16 is in the first posture, and the convex shape portion 64b of the first gear 64 contacts the partition wall 66e within the concave shape portion 66b. Then, when the biasing force of the biasing unit 56 acts in the opening direction of the operation portion 16, the drive shaft 62 and the drive gear 62b rotate in the counter clockwise direction in FIG. 10. Thereby, the first gear 64 that meshes with the drive gear 62b rotates in the clockwise direction in FIG. 10.

Then, the convex shape portion 64b presses the partition wall 66e, and the second gear 66 is rotated in the clockwise direction. Then, the gear portion 16b that meshes with the second gear 66 rotates in the counter clockwise direction in FIG. 10. Thereby, the operation portion 16 rotates to the apparatus depth front side of the apparatus main body 12 from the first posture toward the second posture or the third posture.

Then, as shown in FIG. 11, the operation portion 16 takes the third posture. Note that, in this state, rotation of the drive shaft 62 and the drive gear 62b in the counter clockwise direction in FIG. 11 is regulated by the rotation stopping unit 72 which will be described later. Accordingly, rotation of the first gear 64 that meshes with the drive gear 62b in the counter clockwise direction in FIG. 11 is also regulated.

Here, the clearance between the first gear 64 and the second gear 66, that is, the concave shape portion 66b is provided. When the user sets the operation portion 16 from the third posture that is a state of being inclined to the apparatus front side of the apparatus main body 12, that is, a posture between the first posture and second posture to the second posture in a fully open state, and furthermore, rotates the operation portion 16 to the apparatus front side, the concave shape portion 66b and the convex shape portion 64b of the second gear 66 are relatively moved in the circumferential direction.

In detail, when the operation portion 16 is rotated in the counter clockwise direction in FIG. 11, the gear portion 16b is also rotated in the counter clockwise direction. Accompanying the movement, the second gear 66 starts rotation in the clockwise direction in FIG. 11. Then, an abutting state of the convex shape portion 64b and the partition wall 66e is eliminated. Then, the concave shape portion 66b moves in a direction in which the partition wall 66e separates with respect to the convex shape portion 64b, that is, a direction in which the partition wall 66f approaches. Thereby, the convex shape portion 64b relatively moves from the partition wall 66e side to the partition wall 66f side within the concave shape portion 66b (refer to FIG. 12).

That is, the first gear 64 and the second gear 66 are able to rotate relatively to each other according to the amount of relative movement of the convex shape portion 64b within the concave shape portion 66b. Thereby, even if the rotation of the first gear 64 is regulated by the rotation stopping unit 72, it is possible to rotate the operation portion 16 by an angle according to the amount of relative movement.

Rotation Stopping Unit

Next, the rotation stopping unit 72 will be described with reference to FIGS. 5, 6, 13, 14, and 21. In the example, the third gear 68 is provided with a gear portion 68a and a shaft portion 68b. The gear portion 68a meshes with a gear portion 80a that is provided in a damper 80. In the example, the damper 80 is configured so as to give resistance when the third gear 68, that is, the drive shaft 62 rotates. In the example, the damper 80 is configured by a known rotary damper, a swing damper, and the like.

Here, the relationship between the shaft portion 68b and the bearing member 70 will be described with reference to FIGS. 13, 14, and 21. The bearing member 70 is attached to the support member 74 so as to cover the shaft portion 68b from the apparatus height direction upper side of the third gear 68. In addition, the damper 80 and the gear portion 80a are attached to the support member 74 in a state of meshing with the gear portion 68a of the third gear 68.

Referring to FIG. 13, a rotation regulated portion 68c which protrudes from the shaft portion 68b in a radial direction is provided on the shaft portion 68b of the third gear 68. In addition, a rotation regulating portion 70a is provided in the bearing member 70. FIG. 13 indicates a relationship between the rotation regulated portion 68c and the rotation regulating portion 70a with the operation portion 16 in the first posture (refer to FIG. 1). In this state, the rotation regulated portion 68c of the third gear 68 is separated from the rotation regulating portion 70a, and is in a state in which rotation of the third gear 68, and thus, of the drive shaft 62 is possible in the counter clockwise direction in FIG. 13.

Then, when the operation portion 16 rotates from the first posture to the third posture, the drive shaft 62, and thus, the third gear 68 rotate in the counter clockwise direction in FIGS. 13 and 14. As a result, as shown in FIG. 14, the rotation regulated portion 68c of the third gear 68 engages with the rotation regulating portion 70a. Then, the rotation regulating portion 70a is in a state of regulating rotation of the third gear 68, and thus, the drive shaft 62 in the counter clockwise direction in FIG. 14. That is, rotation of the first gear 64 is regulated in the counter clockwise direction in FIG. 11.

Note that, in the example, in a state in which the rotation regulated portion 68c of the third gear 68 and the rotation regulating portion 70a abut, that is, a state in which the operation portion 16 is in the third posture, the elastic energy of the biasing unit 56 is set such that a part remains. That is, when the operation portion 16 is in the third posture, the biasing unit 56 has elastic energy. Accordingly, the operation portion 16 is reliably switched from the first posture to the third posture.

In addition, in the example, the size of the elastic energy, that is, the biasing force of the biasing unit 56 in the state in which the operation portion 16 is in the third posture is set to a size at which the operation portion 16 is not pressed in the closed direction when the operation portion 16 is operated and inserted.

Posture Holding Unit

Note that, referring to FIG. 5 again, a one way clutch 82 is provided on the posture holding unit 60 in the example. In the example, for example, a known one way clutch is assembled in the posture holding unit 60. Then, torque of the one way clutch 82 of the posture holding unit 60 acts such that resistance is given when the operation portion 16 rotates from the third posture or the second posture toward the first posture, that is, is closed. Thereby, the posture of the operation portion 16 of the apparatus main body 12 is held.

In addition, in the example, when the operation portion 16 takes the first posture, the operation portion 16 prevents unexpected switching from the first posture to the third posture in response to the biasing force of the biasing unit 56, and known latch unit (not illustrated) is provided between the apparatus main body 12 and the operation portion 16. Then, when the latch unit is released, the operation portion 16 is switched from the first posture to the second posture by the biasing force of the biasing unit 56.

Summarizing the description above, in the example, since the operation portion 16 is opened using the biasing force of the biasing unit 56, that is, since a driving motor is not used, energy saving is achieved while it is possible to suppress the jarring driving sound. In addition, since the operation portion 16 is opened using the biasing unit 56 and the damper 80, it is possible to produce a high-class feeling in an opening and closing operation of the operation portion 16. In addition, it is not necessary to separate each gear from each other such as an intermittent gear or a planetary gear in a mechanism of a gear for opening and closing the operation portion 16 using the biasing release unit 58 and the rotation stopping unit 72 in combination, and it is possible to simplify the apparatus configuration.

Biasing Release Unit and Rotation Stopping Unit Assembly

Next, assembly of the biasing release unit 58 and the rotation stopping unit 72 will be described with reference to FIGS. 15 to 21. First, with reference to FIG. 15, the drive shaft 62 is inserted into the biasing unit 56. Then, the engaging portion 62a of the drive shaft 62 is inserted in the third gear 68. At this time, the one end portion 56a of the biasing unit 56 is inserted and fixed in the third gear 68.

Next, one end portion 56a, that is, the drive shaft 62 and the third gear 68 are rotated by a specific number of rotations with respect to the other end portion 56b of the biasing unit 56, and predetermined elastic energy is applied to the biasing unit 56. Then, in that state, as shown in FIG. 16, the biasing unit 56, the drive shaft 62, and the third gear 68 is set to the support member 74. At that time, a jig pin 84 is inserted into a jig pin mounting hole 62e which is provided on the drive shaft 62 and a tip end of the jig pin 84 is inserted in the support member 74 such that the elastic energy of the biasing unit 56 is not released.

In this state, the other end portion 56b of the biasing unit 56 engages with an engaging portion 74a of the support member 74. Then, rotation of the drive shaft 62 and the third gear 68 is regulated by inserting the jig pin 84 into the support member 74.

Next, as shown in FIG. 17, the bearing member 70 is attached to the support member 74 so as to cover the shaft portion 68b of the third gear 68. Next, the damper 80 is attached to the support member 74 such that the gear portion 80a and the gear portion 68a of the third gear 68 mesh.

Next, with reference to FIG. 18, the first gear 64 and the second gear 66 are attached to the support member 74. At this time, the first gear 64 and the second gear 66 are set in the support member 74 in a coaxial state passing through the shaft member 67 (refer to FIGS. 10 to 12). At that time, the first gear 64 is set in the support member 74 such that the phase setting tooth 62d of the drive gear 62b meshes in the cutout portion 64e of the first gear 64. That is, there is a state in which the first phase setting portion 76 is configured.

Then, the jig pin 86 passes from the apparatus width direction left side with respect to the support member 74. Then, the jig pin 86 passes in order the phase setting hole 66d of the second gear 66 and the phase setting hole 64d of the first gear 64. Thereby, phase combination of the first gear 64 and the second gear 66 is performed.

Next, with reference to FIG. 19, a rear surface side member 16d that configures the rear surface side of the operation portion 16 is attached to the support member 74. At this time, the rear surface side member 16d is attached to the support member 74 such that the rotary shaft 16a of the operation portion 16 is axially supported on the bearing portion 74b that is provided in the support member 74. In addition, the rear surface side member 16d and the second gear 66 are adjusted such that the phase setting tooth 66g of the second gear 66 meshes with the cutout portion 16c in the gear portion 16b. Thereby, there is a state in which the second phase setting portion 78 is configured.

Thereby, the phase of the first phase setting portion 76 and the second phase setting portion 78 and the phase in which the rotation of the rotation stopping unit 72 is stopped are synchronized. That is, when the rotation of the drive shaft 62 is stopped by the rotation stopping unit 72, the operation portion 16 is set to take the third posture.

Next, as shown in FIG. 20, in a state in which the rotary shaft 16a is axially supported in the bearing portion 74b, the bearing member 88 is attached to the support member 74 from the apparatus height direction upper side of the rotary shaft 16a. Then, as shown in FIG. 21, the assembly of the biasing release unit 58 and the rotation stopping unit 72 is completed by pulling out the jig pins 84 and 86 respectively from the support member 74 and the biasing release unit 58.
Modification of Examples (1) In the example, there is a configuration in which the posture holding unit 60 is provided on the apparatus width direction right side of the operation portion 16, but in addition to this configuration, there may be a configuration in which the posture holding unit 60 is provided between the second gear 66 and the gear portion 16b of the operation portion 16.

(2) In the example, there is a configuration in which the biasing unit 56, the biasing release unit 58, and the rotation stopping unit 72 are provided on the apparatus width direction left side of the operation portion 16 and the posture holding unit 60 is provided on the apparatus width direction right side, but in addition to this configuration, there may be a configuration in which the biasing unit 56, the biasing release unit 58, and the rotation stopping unit 72 are provided on the apparatus width direction right side and the posture holding unit 60 is provided on the apparatus width direction left side, or the biasing unit 56, the biasing release unit 58, the posture holding unit 60, and the rotation stopping unit 72 may be collectively disposed on the apparatus width direction right side or the apparatus width direction left side.

(3) In the example, the biasing unit 56, the biasing release unit 58, and the rotation stopping unit 72 are applied to the opening and closing unit of the operation portion 16, but in addition to this configuration, application is further possible to an opening and closing operation of the scanner portion 14, an attachment and detachment operation of the medium accommodating portion 32 (advancing and retreating operation in the apparatus depth direction), an advancing and retreating operation of a CD-R tray, and the like. In more detail, for example, it is possible to stroke by the biasing force of the biasing unit 56 from a state of being set in the apparatus main body 12 in a cassette that is an example of the medium accommodating portion 32 up to a functionally required position in the apparatus depth direction, and furthermore it is also possible for the user to stroke the cassette manually from the functionally required position.

(4) In addition, when the operation portion 16 takes the third posture, a lock mechanism may be provided that locks to regulate the rotation of the operation portion 16 between the operation portion 16 and the apparatus main body 12. Thereby, it is possible to suppress lowering of operation by the operation portion 16 pressing in the closing direction during operation input of the operation portion 16.

Summarizing the description above, the printer 10 is provided with the operation portion 16 that is provided to be able to open and close with respect to the apparatus main body 12 which is provided with the recording portion 44 that performs recording on the medium via the rotary shaft 16a and is rotatable between the first posture that is the closed posture and the second posture that is the open posture, the biasing unit 56 that biases the operation portion 16 in the opening direction, and the biasing release unit 58 that releases the action of the biasing force applied by the biasing unit 56 to the operation portion 16 in a range from the third posture, which is the posture between the first posture and the second posture, to the second posture.

According to the configuration described above, since the operation portion 16 rotates in the opening direction in response to the biasing force of the biasing unit 56, it is possible to suppress the jarring driving sound compared with a configuration in which the operation portion 16 is opened by utilizing the driving source such as the motor.

In addition, the biasing force of the biasing unit 56 does not act on the operation portion 16 by the biasing release unit 58 in a range in which the operation portion 16 moves from the third posture to the second posture, and therefore, it is possible to secure a degree of freedom of operation of the operation portion 16.

The biasing release unit 58 includes the first gear 64 in which the biasing force of the biasing unit 56 acts normally, the rotation stopping unit 72 that stops rotation of the first gear 64 in the third posture when the operation portion 16 moves from the first posture to the second posture, and the second gear 66 that engages with the first gear 64 and transfers the rotation of the first gear 64 to the operation portion 16, in which the clearance, that is, the concave shape portion 66b in which the second gear 66 is able to rotate independently from the first gear 64 is provided between the first gear 64 and the second gear 66, and by the concave shape portion 66b, the operation portion 16 rotates between the third posture and the second posture without being subjected to the biasing force of the biasing unit 56.

According to the configuration described above, since there is a configuration in which the operation portion 16 rotates between the third posture and the second posture without being subjected to the biasing force of the biasing unit 56 using the clearance, that is, the concave shape portion 66b which is provided between the first gear 64 and the second gear 66, it is possible to configure the biasing release unit 58 with a simple structure and at low cost.

The operation portion 16 is provided with the gear portion 16b that meshes with the second gear 66, and is provided with the second phase setting portion 78 that sets the meshing phase between the second gear 66 and the gear portion 16b. According to this configuration, it is possible to set the phase between the second gear 66 and the gear portion 16b in an appropriate state with easy workability.

The operation portion 16 is provided with the damper 80 that gives resistance to the rotation of the operation portion 16 when the operation portion 16 is at a posture between the first posture and the third posture. According to this configuration, it is possible to suppress force when the operation portion 16 rotates in response to the biasing force of the biasing unit 56 and it is possible to achieve noise reduction.

The biasing unit 56 has elastic energy in a state in which the operation portion 16 is at the third posture. According to the aspect, when the operation portion 16 is open from the first posture toward the third posture, it is possible to avoid a defect of stopping before the third posture, and it is possible to more reliably switch the operation portion 16 from the first posture to the third posture.

The posture holding unit 60 that holds the posture of the operation portion 16 is provided between the third posture and the second posture of the operation portion 16. According to this configuration, it is possible to hold the posture of the operation portion 16 between the third posture and the second posture.

In the apparatus main body 12 provided with the recording portion 44 that performs recording on the medium, the printer 10 is provided with the operation portion 16 that is movable between the first position and the second position which is the position that is located further from the apparatus main body 12 than the first position, the biasing unit 56 that biases the operation portion 16 in the direction of protrusion, and the biasing release unit 58 that releases the action of the biasing force applied by the biasing unit 56 to the operation portion 16 in a range from the third position which is the position between the first position and the second position to the second position.

According to the configuration described above, since the operation portion 16 moves in the direction of protrusion in response to the biasing force of the biasing unit 56, it is possible to suppress the jarring driving sound compared with a configuration in which the operation portion 16 is caused to protrude by utilizing the driving source such as the motor. In addition, the biasing force of the biasing unit 56 does not act on the operation portion 16 in response to the biasing release unit 58 in a range in which the operation portion 16 moves from the third position to the second position, and therefore, it is possible to secure a degree of freedom of operation of the operation portion 16.

The printer 10 is provided with the operation portion 16 that is provided to be able to open and close the apparatus main body 12 which is provided with the scanner portion 14 that reads the document via the rotary shaft 16a and is rotatable between the first posture that is the closed posture and the second posture that is the open posture, the biasing unit 56 that biases the operation portion 16 in the opening direction, and the biasing release unit 58 that releases the action of the biasing force applied by the biasing unit 56 to the operation portion 16 in the range from the third posture, which is the posture between the first posture and the second posture, to the second posture.

According to the configuration described above, since the operation portion 16 rotates in the opening direction in response to the biasing force of the biasing unit 56, it is possible to suppress the jarring driving sound compared with a configuration in which the rotating body is opened by utilizing the driving source such as the motor. In addition, the biasing force of the biasing unit 56 does not act on the operation portion 16 in response to the biasing release unit 58 in a range in which the operation portion 16 moves from the third posture to the second posture, and therefore, it is possible to secure a degree of freedom of operation of the operation portion 16.

In the apparatus main body 12 provided with the scanner portion 14 that reads the document, the printer 10 is provided with the operation portion 16 that is movable between the first position and the second position which is the position that is located further from the apparatus main body 12 than the first position, the biasing unit 56 that biases the operation portion 16 in the direction of protrusion, and the biasing release unit 58 that releases an action of the biasing force applied by the biasing unit 56 to the operation portion 16 in a range from the third position which is the position between the first position and the second position to the second position.

According to the configuration described above, since the operation portion 16 moves in the direction of protrusion in response to the biasing force of the biasing unit 56, it is possible to suppress the jarring driving sound compared with a configuration in which the operation portion 16 is caused to protrude by utilizing the driving source such as the motor. In addition, the biasing force of the biasing unit 56 does not act on the operation portion 16 in response to the biasing release unit 58 in a range in which the operation portion 16 moves from the third position to the second position, and therefore, it is possible to secure a degree of freedom of operation of the operation portion 16.

In addition, in the embodiment, the biasing unit 56, the biasing release unit 58, and the rotation stopping unit 72 according to the invention are applied in the ink jet printer as an example of the recording apparatus, but it is also possible to generally apply the invention to other liquid ejecting apparatuses.

Here, the liquid ejecting apparatus is not limited to a recording apparatus such as a printer, a copier, or a facsimile which uses an ink jet recording head and performs recording on the recording medium by discharging ink from the recording head, and includes an apparatus which adheres liquid to an ejection medium by ejecting the liquid that corresponds to use in place of ink onto the ejection medium which is equivalent to the recording medium from a liquid ejecting head that is equivalent to the ink jet recording head.

As the liquid ejecting head, in addition to the recording head, there are examples of a color material ejecting head which is used for manufacturing a color filter for a liquid crystal display or the like, an electrode material (conductive paste) ejecting head which is used for forming electrodes such as an organic EL display or a field emission display (FED), a biological organic matter ejecting head which is used for manufacturing biochips, a sample ejecting head as a precision pipette, and the like.

Note that, the invention is not limited to the examples described above, and various modifications are possible within the scope of the invention described in the claims which can be said to include the inventions included in the scope of the invention.

The entire disclosure of Japanese Patent Application No. 2016-035180, filed Feb. 26, 2016 is expressly incorporated by reference herein.

What is claimed is:
1. A recording apparatus comprising:
   a rotating body that opens and closes an apparatus main body which is provided with a recording portion that performs recording on a medium and rotates between a first posture that is a closed posture and a second posture that is an open posture;
   a biasing unit that biases the rotating body in an opening direction; and
   a biasing release unit that releases an action of a biasing force applied by the biasing unit to the rotating body in a range from a third posture, which is a posture between the first posture and the second posture, to the second posture.
2. The recording apparatus according to claim 1, wherein the biasing release unit includes:
   a first gear on which the biasing force of the biasing unit acts normally;

a rotation stopping unit that stops rotation of the first gear in the third posture when the rotating body moves from the first posture to the second posture; and a second gear that engages with the first gear and transfers the rotation of the first gear to the rotating body, and wherein a clearance in which the second gear is able to rotate independently from the first gear is provided between the first gear and the second gear, and using the clearance, the rotating body rotates between the third posture and the second posture without being subjected to the biasing force of the biasing unit.

3. The recording apparatus according to claim 2, wherein the rotating body is provided with a meshing portion that meshes with the second gear, and a phase setting portion that sets a meshing phase is provided between the second gear and the meshing portion.

4. The recording apparatus according to claim 1, further comprising:

a damper that provides resistance to rotation of the rotating body when the rotating body has a posture between the first posture and the third posture.

5. The recording apparatus according to claim 1, wherein the biasing unit has elastic energy in a state in which the rotating body is in the third posture.

6. The recording apparatus according to claim 1, further comprising:

a posture holding unit that holds the posture of the rotating body between the third posture and the second posture.

7. A recording apparatus comprising:

a moving object that moves between a first position and a second position which is a position that is located further from the apparatus main body than the first position in an apparatus main body including a recording portion that performs recording on a medium;

a biasing unit that biases the moving object in a direction of a protrusion; and a biasing release unit that releases an action of a biasing force applied by the biasing unit to the moving object in a range from a third position, which is a position between the first position and the second position, to the second position.

8. An image reading apparatus comprising:

a rotating body that opens and closes an apparatus main body which is provided with a reading portion that reads a document and is rotatable between a first posture that is a closed posture and a second posture that is an open posture;

a biasing unit that biases the rotating body in an opening direction; and a biasing release unit that releases an action of a biasing force applied by the biasing unit to the rotating body in a range from a third posture, which is a posture between the first posture and the second posture, to the second posture.

9. An image reading apparatus comprising:

a moving object that moves between a first position and a second position which is a position located further from the apparatus main body than the first position in an apparatus main body including a reading portion that reads a document;

a biasing unit that biases the moving object in a direction of a protrusion; and a biasing release unit that releases an action of a biasing force applied by the biasing unit to the moving object in a range from a third position, which is a position between the first position and the second position, to the second position.

* * * * *